US008354294B2

(12) United States Patent
de Rochemont et al.

(10) Patent No.: US 8,354,294 B2
(45) Date of Patent: Jan. 15, 2013

(54) LIQUID CHEMICAL DEPOSITION APPARATUS AND PROCESS AND PRODUCTS THEREFROM

(76) Inventors: L. Pierre de Rochemont, Austin, TX (US); Alexander J. Kovacs, Austin, TX (US)

( * ) Notice: Subject to any disclaimer, the term of this patent is extended or adjusted under 35 U.S.C. 154(b) by 33 days.

(21) Appl. No.: 12/843,112

(22) Filed: Jul. 26, 2010

(65) Prior Publication Data

US 2011/0021007 A1 Jan. 27, 2011

Related U.S. Application Data

(63) Continuation-in-part of application No. 11/626,840, filed on Jan. 24, 2007, now Pat. No. 7,763,917.

(60) Provisional application No. 60/761,725, filed on Jan. 24, 2007.

(51) Int. Cl.
*H01L 31/062* (2012.01)
*H01L 31/048* (2006.01)

(52) U.S. Cl. .............. 438/66; 438/80; 438/98; 257/290; 257/291; 257/434; 257/446; 257/461; 136/244; 136/251

(58) Field of Classification Search .................... 438/66, 438/80, 98; 257/290, 291, 434, 446, 461; 136/244, 251
See application file for complete search history.

(56) References Cited

U.S. PATENT DOCUMENTS

| | | | |
|---|---|---|---|
| 2,283,925 | A | 5/1942 | Harvey |
| 2,886,529 | A | 5/1959 | Louis |
| 3,574,114 | A | 4/1971 | Monforte |
| 3,614,554 | A | 10/1971 | Shield et al. |
| 3,983,077 | A | 9/1976 | Fuller et al. |
| 4,400,683 | A | 8/1983 | Eda et al. |
| 4,455,545 | A | 6/1984 | Shelly |
| 4,523,170 | A | 6/1985 | Huth, III |
| 4,646,038 | A | 2/1987 | Wanat |
| 4,759,120 | A | 7/1988 | Bernstein |
| 4,859,492 | A | 8/1989 | Rogers, Jr. et al. |
| 4,880,770 | A | 11/1989 | Mir et al. |
| 4,967,201 | A | 10/1990 | Rich, III |
| 5,084,749 | A | 1/1992 | Losee et al. |
| 5,130,675 | A | 7/1992 | Sugawara |
| 5,139,999 | A | 8/1992 | Gordon et al. |
| 5,154,973 | A | 10/1992 | Imagawa et al. |
| 5,198,824 | A | 3/1993 | Poradish |
| 5,217,754 | A | 6/1993 | Santiago-Aviles et al. |

(Continued)

FOREIGN PATENT DOCUMENTS

EP 0026056 A1 4/1981

(Continued)

OTHER PUBLICATIONS

R. Khun et al., "Charcterization of Novel Mono- and Bifacially Active Semi-Transparent Crystalline Silicon Solar Cells", IEEE Transactions on Electron Devices, 46(10), Oct. 1999, p. 2013-2017.

(Continued)

*Primary Examiner* — Dao H Nguyen

(74) *Attorney, Agent, or Firm* — Burns & Levinson LLP; Jacob N Erlich; David W Gomes

(57) ABSTRACT

A method, apparatus and material produced thereby in an amorphous or crystalline form having multiple elements with a uniform molecular distribution of elements at the molecular level.

39 Claims, 18 Drawing Sheets

U.S. PATENT DOCUMENTS 5,219,377 A 6/1993 Poradish
5,263,198 A 11/1993 Geddes et al.
5,272,485 A 12/1993 Mason et al.
5,403,797 A 4/1995 Ohtani et al.
5,427,988 A 6/1995 Sengupta et al.
5,456,945 A 10/1995 McMillan et al.
5,478,610 A 12/1995 Desu et al.
5,513,382 A 4/1996 Agahi-Kesheh et al.
5,535,445 A 7/1996 Gunton
5,540,772 A 7/1996 McMillan et al.
5,543,773 A 8/1996 Evans et al.
5,584,053 A 12/1996 Kommrusch et al.
5,590,387 A 12/1996 Schmidt et al.
5,614,252 A 3/1997 McMillan et al.
5,625,365 A 4/1997 Tom et al.
5,635,433 A 6/1997 Sengupta
5,707,459 A 1/1998 Itoyama et al.
5,707,715 A 1/1998 deRochemont et al.
5,747,870 A 5/1998 Pedder
5,759,923 A 6/1998 McMillan et al.
5,764,189 A 6/1998 Lohninger
5,771,567 A 6/1998 Pierce et al.
5,854,608 A 12/1998 Leisten
5,859,621 A 1/1999 Leisten
5,888,583 A 3/1999 McMillan et al.
5,889,459 A 3/1999 Hattori et al.
5,892,489 A 4/1999 Kanba et al.
5,903,421 A 5/1999 Furutani et al.
5,933,121 A 8/1999 Rainhart et al.
5,945,963 A 8/1999 Leisten
6,023,251 A 2/2000 Koo et al.
6,027,826 A * 2/2000 deRochemont et al. ...... 428/702
6,028,568 A 2/2000 Asakura et al.
6,031,445 A 2/2000 Marty et al.
6,040,805 A 3/2000 Huynh et al.
6,046,707 A 4/2000 Gaughan et al.
6,052,040 A 4/2000 Hino
6,111,544 A 8/2000 Dakeya et al.
6,143,432 A 11/2000 de Rochemont et al.
6,154,176 A 11/2000 Fathy et al.
6,176,004 B1 1/2001 Rainhart et al.
6,181,297 B1 1/2001 Leisten
6,188,368 B1 2/2001 Koriyama et al.
6,195,049 B1 2/2001 Kim et al.
6,204,203 B1 3/2001 Narwankar et al.
6,208,843 B1 3/2001 Huang et al.
6,222,489 B1 4/2001 Tsuru et al.
6,266,020 B1 7/2001 Chang
6,271,803 B1 8/2001 Watanabe et al.
6,300,894 B1 10/2001 Lynch et al.
6,320,547 B1 11/2001 Fathy et al.
6,323,549 B1 11/2001 deRochemont et al.
6,492,949 B1 12/2002 Breglia et al.
6,496,149 B1 12/2002 Birnbaum et al.
6,501,415 B1 12/2002 Viana et al.
6,541,820 B1 4/2003 Bol
6,552,693 B1 4/2003 Leisten
6,559,735 B1 5/2003 Hoang et al.
6,583,699 B2 6/2003 Yokoyama
6,605,151 B1 * 8/2003 Wessels et al. ............... 117/103
6,611,419 B1 8/2003 Chakravorty
6,620,750 B2 9/2003 Kim et al.
6,639,556 B2 10/2003 Baba
6,642,908 B2 11/2003 Pleva et al.
6,650,303 B2 11/2003 Kim et al.
6,670,497 B2 12/2003 Tashino et al.
6,680,700 B2 1/2004 Hilgers
6,683,576 B2 1/2004 Achim
6,686,406 B2 2/2004 Tomomatsu et al.
6,690,336 B1 2/2004 Leisten et al.
6,697,605 B1 2/2004 Atokawa et al.
6,742,249 B2 6/2004 deRochemont et al.
6,743,744 B1 6/2004 Kim et al.
6,762,237 B2 7/2004 Glatkowski et al.
6,791,496 B1 9/2004 Killen et al.
6,864,848 B2 3/2005 Sievenpiper
6,906,674 B2 6/2005 McKinzie, III et al.
6,919,119 B2 7/2005 Kalkan et al.
7,047,637 B2 5/2006 deRochemont et al.
7,405,698 B2 7/2008 deRochemont
7,564,887 B2 7/2009 Wang et al.
7,763,917 B2 7/2010 deRochemont
2001/0023779 A1 9/2001 Sugaya et al.
2001/0027119 A1 10/2001 Furutani et al.
2001/0048969 A1 12/2001 Constantino et al.
2002/0039667 A1 4/2002 Takaya et al.
2002/0047768 A1 4/2002 Duffy
2002/0070983 A1 6/2002 Kozub et al.
2002/0092472 A1 7/2002 Hayashi et al.
2002/0110004 A1 8/2002 Parks
2002/0190818 A1 12/2002 Endou et al.
2003/0002045 A1 1/2003 Nemat-Nasser et al.
2003/0034124 A1 2/2003 Sugaya et al.
2003/0073565 A1 4/2003 Ellis et al.
2003/0080325 A1 5/2003 Uchiyama et al.
2003/0107455 A1 6/2003 Imanaka et al.
2003/0111714 A1 6/2003 Bates et al.
2003/0122647 A1 7/2003 Ou
2003/0148024 A1 8/2003 Kodas et al.
2003/0161959 A1 8/2003 Kodas et al.
2003/0170436 A1 9/2003 Sumi et al.
2003/0221621 A1 12/2003 Pokharna et al.
2004/0000964 A1 1/2004 Killen et al.
2004/0000966 A1 1/2004 Killen et al.
2004/0000970 A1 1/2004 Killen et al.
2004/0000972 A1 1/2004 Killen et al.
2004/0000975 A1 1/2004 Killen et al.
2004/0000976 A1 1/2004 Killen et al.
2004/0001024 A1 1/2004 Killen et al.
2004/0001026 A1 1/2004 Killen et al.
2004/0001027 A1 1/2004 Killen et al.
2004/0001028 A1 1/2004 Killen et al.
2004/0012081 A1 1/2004 Kwon
2004/0033654 A1 2/2004 Yamagata
2004/0070915 A1 4/2004 Nagai et al.
2004/0084080 A1 5/2004 Sager et al.
2004/0092236 A1 5/2004 Irie et al.
2004/0113738 A1 6/2004 Ahn et al.
2004/0118448 A1 6/2004 Scher et al.
2004/0189528 A1 9/2004 Killen et al.
2005/0036269 A1 2/2005 Ma et al.
2005/0051870 A1 3/2005 Yamazaki et al.
2006/0073275 A1 * 4/2006 Maruyama et al. ........ 427/248.1
2006/0086994 A1 4/2006 Viefers et al.
2006/0092079 A1 5/2006 deRochemont
2006/0125681 A1 6/2006 Smith et al.
2006/0134491 A1 6/2006 Hilchenko et al.
2007/0003781 A1 1/2007 deRochemont
2007/0137257 A1 6/2007 DeSantolo et al.
2007/0139976 A1 6/2007 deRochemont
2007/0166453 A1 * 7/2007 Van Duren et al. ........... 427/190
2007/0170535 A1 7/2007 deRochemont
2007/0259768 A1 11/2007 Kear et al.
2008/0136395 A1 6/2008 Bennett
2009/0004370 A1 1/2009 Zurcher et al.
2009/0011922 A1 1/2009 deRochemont
2009/0015314 A1 1/2009 Kirchmeier et al.
2011/0049394 A1 3/2011 deRochemont
2011/0065224 A1 * 3/2011 Bollman et al. ................ 438/62
2011/0248900 A1 10/2011 deRochemont

FOREIGN PATENT DOCUMENTS

EP 0939451 A1 1/1999
EP 1376759 A2 2/2004
GB 1125897 A 9/1968

OTHER PUBLICATIONS

Andrenko, A.S. et al. EM Analysis of PBG Substrate Microstrip Circuits for Integrated Transmitter Front End. MMET 2000 Proceedings pp. 295-297.

Bardi, I. et al. Plane Wave Scattering From Frequency-Selective Surfaces by the Finite-Element Method. IEEE Transactions on Magnetics 38(2) Mar. 2002. pp. 641-644.

Chappell, W. et al. Composite Metamaterial Systems for Two-Dimensional Periodic Structures. © 2002 IEEE pp. 384-387.

Cheng, Y.L. et al. Preparation and Characterization of (Ba.Sr)TiO3 thin films using interdigital electrodes. Microelectronic Engineering vol. 66 (2003) 872-879.
Clavijo, S. et al. Design Methodology for Sievenpiper High-Impedance Surfaces: An Artificial Magnetic Conductor for Positive Gain Electrically Small Antennas. IEEE Transactions on Antennas and Propagation 51(10). Oct. 2003. pp. 2678-2690.
Diaz, R. et al. Magnetic Loading of Artificial Magnetic Conductors for Bandwidth Enhancement. © 2003 IEEE pp. 431-434.
Hansen, R.C. Effects of a High-Impedance Screen on a Dipole Antenna. IEEE Antennas and Wireless Propagation Letters vol. 1 2002 pp. 46-49.
Joshi, P.C. et al. Processing and Characterization of Pure and Doped Ba0.6Sr 0.4TiO3 thin films for tunable microwave applications. Mat. Res. Soc. Symp. Proc. vol. 656E (2001) DD4.9.1-DD4.9.6.
Kern, D.J. et al. Active Negative Impedance Loaded EBG Structures for the Realization of Ultra-Wideband Artificial Magnetic Conductors. © 2003 IEEE pp. 427-430.
Kern, D.J. et al. The Synthesis of Metamaterial Ferrites for RF Applications Using Electromagnetic Bandgap Structures. © 2003 IEEE pp. 497-500.
Kern, D.J. et al. Ultra-thin Electromagnetic Bandgap Absorbers Synthesized via Genetic Algorithms. © 2003 IEEE pp. 1119-1122.
Kretly, L.C. et al. The Influence of the Height Variation on the Frequency Bandgap in an AMC Artificial Magnetic Conductor for Wireless Applications: an EM Experimental Design Approach. Proceedings SBMO/IEEE MTT-S IMOC 2003 pp. 219-223.
Lee, Y. et al. Investigation of Electromagnetic Bandgap (EBG) Structures for Antenna Pattern Control. © 2003 IEEE, pp. 1115-1118.
McKinzie III, W.E. et al. Mitigation of Multipath Through the Use of an Artificial Magnetic Conductor for Precision CPS Surveying Antennas. © 2002 IEEE pp. 640-643.
McKinzie, W. et al. A Multi-Band Artificial Magnetic Conductor Comprised of Multiple FSS Layers. © 2003 IEEE pp. 423-426.
Monorchio, A. et al. Synthesis of Artificial Magnetic Conductors by Using Multilayered Frequency Selective Surfaces. IEEE Antennas and Wireless Propagation Letters vol. 1 2002 pp. 196-199.
Mosallaei, H. et al. Periodic Bandgap and Effective Dielectric Materials in Electromagnetics: Characterization and Applications in Nanocavities and Waveguides. IEEE Transactions on Antennas and Propagation 51(3). Mar. 2003. pp. 549-563.
Pontes, F.M. et al. Study of the dielectric and ferroelectric properties of chemically processed BaxSrl-xTiO3 thin films. Thin Solid Films, vol. 386, No. 1 (2001) 91-98.
Rogers, S. et al. AMCs Comprised of Interdigital Capacitor FSS Layers Enable Lower Cost Applications. © 2003 IEEE pp. 411-414.
Rogers, S. et al. An AMC-Based 802.11a/b Antenna for Laptop Computers. © 2003 IEEE pp. 10-13.
Sievenpiper, D.F. et al. Two-Dimensional Beam Steering Using an Electrically Tunable Impedance Surface. IEEE Transactions on Antennas and Propagation 51(10). Oct. 2003. pp. 2713-2722.
Sun, J. et al. Efficiency of Various Photonic Bandgap (PBG) Structures. 3rd Int'l. Conf. on Microwave and Millimeter Wave Technology Proceedings 2002. pp. 1055-1058.
Tsunemine, Y. et al. Pt/BaxSr(1-x)TiO3/Pt Capacitor Technology for 0.15 micron Embedded Dynamic Random Access Memory. Jap. J. Appl. Phys. vol. 43 No. 5A (2004) 2457-2461.
Vest, R.W. Metallo-organic decomposition (MOD) processing of ferroelectric and electro-optic films: A review. Ferroelectrics, 102:1, 53-68.
Viviani, M. et al. Positive Temperature Coefficient of Electrical Resistivity below 150k of Barium Strontium Titanate. J. Amer. Ceram. Soc. vol. 87 (2004) 756-758.
Weily, A.R. et al. Antennas Based on 2-D and 3-D Electromagnetic Bandgap Materials. © 2003 IEEE pp. 847-850.
Yang, H-Y. D. et al. Surface Waves of Printed Antennas on Planar Artificial Periodic Dielectric Structures. IEEE Transactions on Antennas and Propagation 49(3). Mar. 2001. pp. 444-450.
Zhang, Y. et al. Planar Artificial Magnetic Conductors and Patch Antennas. IEEE Transactions on Antennas and Propagation 51(10). Oct. 2003. pp. 2704-2712.
Ziroff, A. et al. A Novel Approach for LTCC Packaging Using a PBG Structure for Shielding and Package Mode Suppression. 33rd European Microwave Conference—Munich 2003 pp. 419-422.
International Search Report dated Jan. 24, 2012 for PCT/US11/45180.

* cited by examiner

800A

1100

LIQUID CHEMICAL DEPOSITION APPARATUS AND PROCESS AND PRODUCTS THEREFROM

CROSS REFERENCE TO RELATED APPLICATIONS

This application is a Continuation-In-Part and claims priority of U.S. patent application Ser. No. 11/626,840, filed Jan. 24, 2007, now U.S. Pat. No. 7,763,917, which claims priority from U.S. Provisional Patent Application 60/761,725 filed Jan. 24, 2006, which applications are incorporated herein by reference in their entirety.

FIELD OF THE INVENTION

The present invention generally relates to the formation of high quality materials (metal oxides/ceramics, metals/superalloys, and semiconductors) on arbitrary surfaces, and in particular to the apparatus and process used to make such high quality materials.

BACKGROUND OF THE INVENTION

Methods that first form a liquid film on the substrate that is subsequently decomposed are collectively referred to herein as metalorganic solution decomposition (MOSD). The de Rochemont et al. patented art further instructs that molecular-level chemical uniformity within the deposit can be generated when the liquid aerosol is sprayed onto a substrate heated to temperatures in the range of 200° C. to 500° C., preferably in the range of 250° C. and 450° C. In this instance, the thermal energy imparted by the heated substrate to the liquid aerosol is sufficient to initiate the simultaneous decomposition of all metalorganic precursor species contained within the aerosol spray, thereby replicating within the deposited oxide the same level of precursor subdivision contained in the metalorganic solution. Metalorganic solution deposition (MOSD) is well represented in the prior art. Alternative methods utilize solution precursor methods to apply a liquid precursor film using spin-coating or spray misting at ambient temperatures. The deposited liquid film is later pyrolyzed into the desired material using a subsequent heating or drying step. These two-step processes are susceptible to phase segregation and the creation of micro-nuclei in multi-component films that can adversely affect the creation of uniform ceramic microstructure. The multi-component liquid film consists of assayed quantities of the distinct molecular precursor species for each of the various metal oxide components desired in the multi-component film. Each distinct molecular precursor species will have a different decomposition temperature. The organic ligand(s) to which a particular metal species is attached to form the molecular precursor will deflagrate and produce the residual metal oxide molecule when it is heated above its respective decomposition temperature. Phase segregated micro-nuclei are created when the temperature of the multi-component liquid film is ramped from ambient temperatures to temperatures that pyrolyze the varied precursor species. Molecular precursor that deflagrate at lower decomposition temperatures will form their respective oxide molecules initially and separate out of the liquid film during their phase change and form micro-clusters of single species oxides or partially mixed oxides as the liquid film is ramped through temperatures that convert some, but not all, of molecular precursors to their residual oxides. Additionally, the molecular precursors having the most robust decomposition temperatures will be last to change into an oxide phase, and will typically do so as an unevenly distributed oxide shell upon the previously formed single species or mixed oxide micro-clusters. The molecular-level chemical uniformity achieved in the liquid phase is subsequently lost during the thermal bake out phase. The resultant non-uniform chemical distribution of oxide components produces conditions with non-uniform chemical kinetics and grain growth at nucleation sites where crystalline phases of the ceramic are formed by post-deposition thermal or radiant heat processing.

Budargin, L., in U.S. Pat. No. 7,211,292 B1 and US2002/0041928 A1, and Budaragin, L, et al. U.S. No. 7,718,221, is used to form high complexity material laminates by first applying a liquid precursor solution at ambient temperatures (≦50° C.) to form a liquid film that is subsequently converted into a metal oxide by heat treatments at temperatures greater than 400° C. As explained below, this two (2)-step process causes phase separation in the deposit through the sequential decomposition of the component precursor.

McMillan et al. (U.S. Pat. Nos. 5,456,945; 5,540,772; 5,614,252; 5,759,923; 5,888,583, hereinafter referred collectively as McMillan et al.) disclose methods and apparatus for disposing liquid precursor films by flowing a mist of liquid metalorganic precursors over a substrate contained within a deposition chamber, where both the substrate and the deposition chamber are held at substantially ambient temperatures. Although this art instructs the use of liquid precursors comprising wet chemistry techniques that include carboxylic acid and alkloxide chemistries to form silicon dioxide and other oxide dielectrics, such as barium strontium titanate (BST), on integrated circuit substrates, the inventors repeatedly advise that heating the deposition chamber and substrate during the deposition process leads to inferior quality films. Under McMillan et al., ambient temperatures must be maintained within the deposition chamber, which may alternatively be held under vacuum or at atmospheric pressure during the deposition process. General ambient temperatures are clearly defined as ranging between −50° C. and 100° C., preferably ranging between 15° C. and 40° C. The initial deposit is a liquid film that is subsequently dried and treated to form a solid oxide layer. Solvents contained within the liquid film are primarily extracted from the deposit using vacuum techniques. Furthermore, in U.S. Pat. No. 5,759,923, McMillan et al. only instruct on a need for water-free alkoxide chemistries when depositing silicon dioxide materials, suggesting that silicon carboxylic acid chemistries can be exposed to water-containing chemical species or atmospheric environments having relatively humidity, such as ambient air. Additional prior art that instructs the application of a liquid film to a substrate by means of an aerosol spray, followed by solvent extraction and subsequent treatment is cited by Hayashi et al. (US Pub. No. 2002/0092472 A1).

Various deposition systems have been developed as industrial processes to form advanced material laminates on a variety of different substrates. These processes include: chemical vapor deposition ("CVD"), atomic layer deposition ("ALD"), physical vapor deposition ("PVD"), evaporation, and molecular beam epitaxy ("MBE"), among others. Each provides benefits and drawbacks relative to the objective of forming compositionally complex materials at low costs.

Chemical vapor deposition (CVD) techniques are often a preferred method for fabricating layered material structures and is cited frequently in the prior art. CVD introduces vapor phase organometallic or metalorganic precursors into the deposition chamber using a carrier gas and can form deposits at relatively high deposition rates (1-10 μm per hour) by pyrolyzing the precursors on the surface of a heated substrate. Many high quality oxide dielectrics often comprise a plurality metal oxide components, and the ability to disperse various precursors within a vapor cloud in the reaction chamber allows multiple components to be subdivided (intermixed) at the molecular level and benefits compositional uniformity. However, the wide ranging vapor pressures (differing by order of magnitude) and decomposition temperatures (often separated by hundreds of degrees Celsius) of the different precursors makes it difficult to maintain compositional uniformity and control in multi-element deposits. In these instances, minor perturbations in temperature across the substrate surface or as a function of time during the deposition cycle can alter localized vapor pressures among varied precursors that subsequently generate localized fluctuations in the deposit's chemistry, which, in turn, disrupts atomic-scale uniformity of the final deposit and cause defects that impairs manufacturing yield in high tolerance applications. These effects limit CVD's ability to the reliable production of moderate complexity materials (comprising 3-4 elemental components). It has proven to be ineffective when processing high complexity materials.

Paz de Araujo et al. (U.S. Pat. Nos. 6,110,531 and 6,511,718) instruct an enhanced chemical vapor deposition (CVD) technique that gasifies liquid precursor solutions comprising metalorganic precursors that may contain metal alkoxide or metal carboxylate chemical species in whole or in part prior to introducing said gasified precursor solutions into a deposition chamber that contains substrates heated to a temperature ranging between 400° C. and 600° C. (Paz de Araujo '531) and 300° C. and 600° C. (Paz de Araujo '718).

ALD mitigates some of the problems associated with CVD's limitations with regards to forming compositionally complex materials by sequentially introducing one precursor at a time into the reaction chamber. The pulsed gases are injected in quantities that are only sufficient to form an atomic layer on the heated substrate surface. Lower deposition rates and limitations on ultimate layer thickness of the deposit are trade-offs when using ALD. As vapor phase methods, CVD and ALD processes will coat the entire substrate surface. Consequently, additional processing steps, such as photolithography/etch or masked surface preparations, are required to pattern the resulting laminate or deposit it in selective surface areas.

PVD bombards the surface a "target" (the source material) with ionized inert gases to dislodge surface atoms from the target that then diffuse on the surface of a substrate to form the deposit. This technique is generally unsuitable for multiple component materials. MBE is an analog to PVD for what ALD is to CVD. While it greatly improves the quality of multiple component materials, the deposition rates are so low that this tool is generally unaffordable for anything but research.

The high substrate temperatures (>500° C.) required by all of the above mentioned industrial process is another major drawback. This thermal energy is sufficient to nucleate the microstructure of the deposited film to grain sizes that destroy the ability to produce laminate that have nanoscale properties. While plasma-enhanced variants of these processes are reported to form deposits at substrate temperatures lower than 500° C. These claims misinform the public because while the substrate may be set to lower temperature the high thermal energy of the "hot" plasma applied to the substrate's surface causes the temperature of the applied precursors and deposited materials to be driven to much higher temperature without necessarily heating the entire substrate. Substrate surface temperatures in the range of 500° C. to 1000's ° C. are typical of plasma-enhanced processes. These enhanced surface temperatures drive nucleation process in the deposited materials beyond the ability to maintain amorphous or nanoscale microstructures.

Furthermore, all of the above referenced processes have been unable to integrate mismatched materials with layer thicknesses greater than sub-micron physical dimensions without cracking and delamination.

DEFINITION OF TERMS

The term "amorphous material" is herein understood to mean a material that does not comprise a periodic lattice of atomic elements, or lacks mid-range (over distances of 10's of nanometers) to long-range crystalline order (over distances of 100's of nanometers).

The term "ambient temperature" or "room temperature" is herein understood to generally mean temperatures ranging between −50° C. and 100° C., and specifically mean temperatures ranging between 15° C. and 40° C.

The term "alkoxide" makes reference to a metalorganic compound that comprises an alcohol compound in which the hydrogen atom originally comprising part of the molecule's terminating C—OH group has been substituted for a metal atom.

The term "bulk deposit" is, herein, defined to mean a material having a thickness greater than 0.2 millimeters that may or may not remain attached to a surface that it had initially been deposited.

The term "carboxylic acid salt" makes reference to a metalorganic compound that comprises a carboxylic acid in which the hydrogen originally comprising part of the molecule's terminating COOH group has been substitute for a metal atom.

The terms, "compositionally complex" or "compositional complexity" is herein understood to mean a material substance that consists of three (3) or more elemental components.

The term, "complex ceramic" is herein understood to mean a ceramic material that consists of three (3) or more metal oxide components, metal nitride components, or metal carbide components.

The term "complex metal" or "superalloy" is herein understood to mean a metallic alloy that consists of three (3) or more elemental metals.

The term "complex semiconductor" is herein understood to mean a semiconductor material, such as a III-V compound or II-VI compound, but not limited to such compounds, that, consists of three (3) or more elements from the periodic table.

The term "gasified" is herein defined in accordance with its general definition and to mean the resultant state of matter after which a solid, liquid or vapor has been heated to the point where it is rendered into a gas.

The term "heavy-metal" is herein defined in accordance with its general definition and to mean elemental metals that are contained in the four lowest rows of the periodic table of the chemical elements.

The term "LCD liquid aerosol" is herein understood to mean micron or sub-micron scale droplets of liquid precursor solutions dispersed as a vapor.

The term "LCD waxy aerosol" is herein understood to mean micron or sub-micron scale carboxylate (or similar) precursor particles that have phase-separated from the solvent used to form a liquid precursor solution.

The term "liquid precursor solution" is herein understood to mean a solution of hydrocarbon molecules that also contains soluble of metalorganic compounds that may or may not be organic acid salts of the hydrocarbon molecules into which they are dissolved.

The term "macroscopic dimensions" is herein understood to define physical dimensions exceeding 0.2 μm in length without limitation.

The term "microstructure" is herein understood to define the elemental composition and physical size of crystalline grains forming a material substance.

The term "mismatched materials" is herein understood to define two materials that have dissimilar crystalline lattice structure, or lattice constants that differ by 5% or more, and/or thermal coefficients of expansion that differ by 10% or more.

The term "molecular-level subdivision" is herein understood to mean a mixture of two or more distinct organic or inorganic compounds that are evenly mixed down to the molecular scale.

The term "morphological phase separation" is herein understood to mean a granular structure within a compositionally complex material body that has chemical composition and crystalline phase that distinct from the average chemical composition of the bulk material in which it is embedded and has physical dimension that are greater than or equal to 2 nm.

The term "mil" is herein understood to mean one one-thousandths of an inch or 25.4 micron (μm).

The term "nanoscale" is herein understood to define physical dimensions measured in lengths ranging from 1 nanometer (nm) to 100's of nanometers (nm).

The term "nanoscale property" or "nanoscale properties" is herein understood to mean a physical or functional property or properties of a given material that is (are) uniquely observed when that material is limited to having nanoscale physical dimensions, but is (are) not observed when the same material has larger than nanoscale physical dimension.

The term "organometallic precursor" is hereinafter understood to describe an organic molecule to which a desired metal atom has been attached directly to a carbon atom.

The term "rapid thermal anneal" is herein defined to mean the application of thermal stimulus having sufficient power to heat a surface layer to temperatures ranging from 600° C. to 2000° C. that do not penetrate more than a desired depth ranging from 0.5 μm to 25 μm for a duration of 1 to 40 seconds. The thermal stimulus may be applied using infrared (IR), ultraviolet (UV), gas plasma, or microwave methods.

The terms "rare earth metals" or "rare earth elements" is, herein, understood to mean the general definition for the lanthanide and actinide elements of the periodic table of the periodic chemical elements.

The term "sacrificial substrate" is, herein, defined to mean a substrate upon which a bulk deposit is formed that is subsequently removed to produce an embodiment that comprises a freestanding bulk deposit.

The terms "silica" or "amorphous silica" are, herein, understood to be used interchangeably with silicon dioxide or vitreous phases of silicon dioxide.

The term "spin-on glass" or "SOG" is hereinafter understood to mean the application of a glassy layer by first applying a spin-coated liquid layer of metalorganic or organometallic precursors to a substrate and pyrolyzing the liquid layer by the subsequent application of thermal energy.

The term "standard operating temperatures" is hereinafter understood to mean temperatures in the range of −40° C. to +125° C.

The term "substrate" is herein defined to mean any material substance that provides a permanent or temporary base for one or more secondary deposited materials.

The term "substrate temperature" is herein defined to mean the bulk temperature to which a bulk substrate is heated, but is distinct from the temperature to which one of its surfaces may be heated during a deposition process.

The term "surface process temperature" is hereinafter understood to mean the physical temperature of a substrate's surface upon which a deposit is being formed, such that surface temperature is maintained by contributions from the bulk substrate temperature and the application of external thermal stimulus, including rapid thermal annealing stimulus, in particular.

The term "superlattice" is, herein, understood to mean a composite structure containing a plurality of dielectric material thin films deposited in sequence to produce dielectric or electrical properties within said superlattice structure that are intrinsically distinct from the dielectric or electrical properties of each of the dielectric material thin films contained within said superlattice if each were prepared to have an equivalent thickness as the superlattice.

The term "thermogravimetric analysis" and its abbreviation "TGA" is defined to mean a standard analytical method that measures how the weight of a material changes as a function of temperature and decomposition products outgas from the material.

The term "thin film" is, herein, defined to mean a surface deposit that has a thickness of between 5 and 2,000 nanometers.

The term "thick film" is, herein, defined to mean a surface deposit that has a thickness of between 2 and 200 microns.

The term "transition-metal" is, herein, defined to mean its generally understood definition, that is, elemental metal contained within the columns III (3) through XII (12) of the period table of the elements.

The expression "weight percent of equivalent oxide" is hereinafter understood to represent the residual weight of metal oxides that have been fully deflagrated from a metalorganic precursor solution expressed as a percentage of the total weight of the metalorganic solution immediately prior to the deflagration process.

The term "wet metalorganic chemistries" is, herein, defined to mean metal moieties in which a metal atom has been attached to at least one organic molecule commonly known as an alkyl, alcohol, or carboxylic acid, wherein the metal atom has been substituted for a hydrogen atom in the original organic molecule. In the case of metal alkyl wet chemistries the metal atom directly bonds to a carbon atom. In alkoxide wet chemistries, the metal atom substitutes a hydrogen atom that is part of a hydroxyl group and is separated from a carbon atom by an oxygen atom. In carboxylic acid wet chemistries, the metal atom substitutes a hydrogen atom that is part of a hydroxyl group and is separated from a carbon atom by an oxygen atom, but said carbon atom is also double-bonded to an additional oxygen atom.

SUMMARY OF THE INVENTION

In one embodiment, the present invention provides a method for forming an amorphous material, comprising the steps of mixing liquid metalorganic precursors in solution, projecting a liquid aerosol of the metalorganic precursor solution toward a surface in a deposition chamber having a controlled gas atmosphere, heating the surface to a temperature higher than decomposition temperatures of the metalorganic precursors, and decomposing the metalorganic precursors upon contact with the heated surface to form the amorphous material.

The method may further comprise exposing the projected aerosol to radiant energy prior to contact with the surface. The step of exposing the projected aerosol may forms thermal gradient in a heating field located adjacent to the surface. The heating field thermal gradient may raise the temperature of the projected liquid aerosol above the evaporation temperature of all liquid solvents in the aerosol. The step of exposing may include heating the projected aerosol to phase separate and evaporate liquid solvents from the aerosolized metalorganic precursors.

The step of projecting may include using a gas or gas mixture which determines the controlled gas atmosphere in the deposition chamber. The gas or gas mixture may be preheated.

The metalorganic precursors may consist of carboxylate salts, alkoxides, or metal alkyls, or β-ketonates.

The surface may heated in the step of heating to a temperature above 250° C. and below any crystallizing nucleation temperature of the amorphous material to be formed, or to a temperature less than 400° C.

The method may further comprise removing any residual organic material from the amorphous material, by the application of a heat treatment in a controlled gas atmosphere that raises the temperature of the formed amorphous material to <450° C. The heat treatment may be performed with the simultaneous application of ultraviolet light.

The method may further comprise forming a crystalline material from formed amorphous material with a subsequent heating step. The subsequent heating step may be a rapid thermal annealing step or a plasma annealing step. The formed crystalline material may have a grain size less than 100 nm in length. The may further comprise removing the surface upon which the amorphous material was formed.

The amorphous material may be a metal oxide ceramic and the controlled gas atmosphere may comprise air, an inert gas mixture containing an oxygen partial pressure, or an inert gas mixture containing chemically oxidizing partial pressures of carbon dioxide and carbon monoxide. The amorphous material may be a metal alloy, superalloy, a semi-metal or semiconductor and the controlled gas atmosphere may comprise an inert gas mixture containing argon, nitrogen or hydrogen, or chemically reducing partial pressures of carbon dioxide and carbon monoxide.

The formed amorphous material may have an elemental composition which varies less ≦±1.5 mol % at the atomic scale. The formed amorphous material may be amorphous silica, indium-tin oxide, gallium arsenide, cadmium telluride, silicon-germanium, germanium or copper indium gallium selenide. The liquid metalorganic precursors may be mixed at a molecular level, and the amorphous material may have a chemically precise mixture of elements that are uniformly subdivided at an atomic scale.

In another embodiment, the present invention provides an apparatus for forming an amorphous material comprising a deposition chamber, a spraying device located for projecting a liquid aerosol of metalorganic precursors toward a surface located in the deposition chamber, and a heater adapted to heat the surface to a temperature higher than the decomposition temperature of the metalorganic precursors, wherein the heater is effective to cause decomposition of the metalorganic precursors upon contact with the surface when heated to form the amorphous material.

The apparatus may further comprise a radiant heater located for exposing the projected liquid aerosol of metalorganic precursors. The radiant heater may form a thermal gradient to raise the temperature of the metalorganic precursors exposed thereto. The thermal gradient may be adapted to raise the temperature of the projected liquid solution above the evaporation temperature of all liquid solvents in the liquid aerosol.

The apparatus may further comprise a controlled gas atmosphere in the deposition chamber, wherein the controlled gas atmosphere and the heater are effective to cause decomposition of the metalorganic precursors upon contact with the surface to form the amorphous material. The spraying device may include a gas source for use in projecting the liquid aerosol and for thereby providing the controlled gas atmosphere. The apparatus may further comprise a supplemental heater coupled for preheating gasses from the gas source prior to projecting the liquid aerosol.

The apparatus may further comprise a secondary bake out station that provides a controlled gas atmosphere and is adapted to remove any residual organic matter by heat treating the formed amorphous material at temperatures between 400° C. and 600° C. The secondary bake-out station may include an ultraviolet light source used to accelerate the removal of organic material from the formed amorphous matter. The apparatus may further comprise an annealing station having a controlled gas environment and a heating mechanism effective to crystallize the formed amorphous material. The heating mechanism may a rapid thermal annealing mechanism or an atmosphere controlled ionizing plasma.

The apparatus may further comprise a robotic handling system adapted to transfer formed amorphous material between one or more deposition chambers, one or more secondary bake-out stations, and one or more annealing stations. The apparatus may further comprise an overall control system for coordinated operation of the robotic handling system, one or more deposition chambers, one or more secondary bake-out stations, and one or more annealing stations. The apparatus may further comprise a device adapted to provide a localized gas environment for shielding the formed amorphous material or reactive elements located on the surface from hazardous atmosphere.

Yet another embodiment of the present invention provides a material comprising four or more elements having an elemental composition which varies less ≦±1.5 mol % at the atomic scale. The elements may have an amorphous or crystalline structure at the atomic level. The elements may have a crystalline structure and a uniform grain size less than or equal to 100 nm. The material may include copper indium gallium selenide

BRIEF DESCRIPTION OF THE DRAWINGS

The present invention is illustratively shown and described in reference to the accompanying drawings, in which.

DETAILED DESCRIPTION OF THE DRAWINGS

Figure 1:
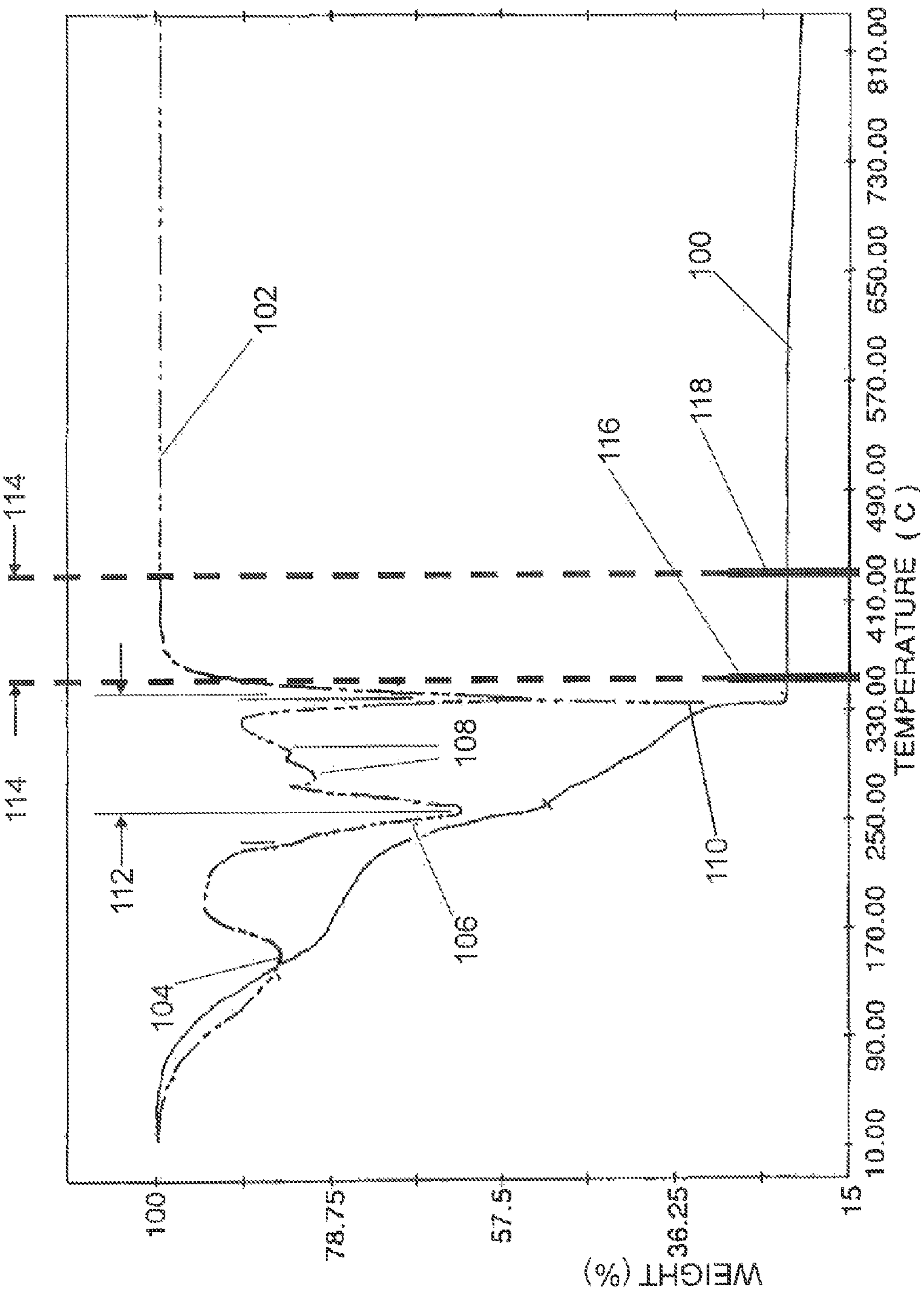
FIG. 1 shows the decomposition spectra measured using thermogravimetric analysis of a liquid precursor solution containing bismuth, lead, copper, strontium, and calcium liquid metalorganic precursors.

The present invention relates generally to a materials manufacturing system that forms extremely high quality materials (metal oxide/ceramic, metal/superalloy, semiconductor) that are uniquely characterized by having an elemental composition with atomic-scale chemical uniformity—irrespective of the material's compositional complexity, throughout its interior, a theoretical density, a nanoscale microstructure (grain sizes controllable to nanometer (nm) physical dimensions), and exceptional surface adhesion (greater than the tensile strength of the material itself) when integrated onto arbitrary substrate materials. These high quality materials are typically formed at deposition rates measured in mils (25.4 microns) per minute. Liquid Chemical Deposition ("LCD") comprises the three (3) general process steps:

Formation of an amorphous deposit by means of applying an aerosol spray of liquid metalorganic precursors, preferably carboxylate precursors, on to a permanent or detachable substrate heated to low-temperature (200° C. to 600° C., preferably 250° C. to 400° C.) in a properly configured deposition chamber;

The removal of residual organic material using a bake-out step, which may or may not be in a separate chamber, that heats the sprayed amorphous deposit to temperatures ranging between 400° C. and 650° C., preferably 400° C. and 450° C., and, An optional rapid thermal annealing step, preferably a plasma annealing step, when it is desirable to transform the amorphous deposit into crystalline or polycrystalline structure.

This sequence is typically used to form a single layer ranging from 1 μm to 25 μm per pass, though it is possible to apply more or less than those specified thicknesses and any thickness so made should be considered an embodiment of the this invention. The sequence is repeated until the desired thickness of the deposited material is greater than the typical thickness of a single sequence.

More particularly, the invention relates to an apparatus and its associated process. The apparatus incorporates a variable level of redundancy of the aforementioned process steps within the same tooling enclosure, such that this process sequence may be applied to several substrates (of varying materials and form factors) simultaneously through the use of a "pick and place" transport system, such as a robotic instrument.

This application incorporates by reference all matter contained in: U.S. patent application Ser. No. 11/626,840, filed Jan. 24, 2007; U.S. patent application Ser. No. 11/243,422 (the '422 application), filed Oct. 3, 2005, now U.S. Pat. No. 7,405,698; U.S. patent application Ser. No. 11/479,159 (the '159 application), filed Jun. 30, 2006; and U.S. patent application Ser. No. 11/620,042 (the '042 application), filed Jan. 4, 2007.

The '422 application, generally, describes inventible art relevant to methods and embodiments that describe the application of silicon dioxide and other oxide dielectrics to form meta-materials dielectrics, antenna modules, electrical interconnect structures, and artificial magnetic ground planes on the surface of a sacrificial substrate or semiconductor device by means of a low-temperature aerosol spray. The '159 application, generally, describes inventible art relevant to methods and embodiments that describe application of silicon dioxide and other oxide dielectrics by means of low-temperature liquid aerosol spray and/or wax-based inkjet techniques to embed passive components (resistors, capacitors, and inductor coils) within organic or ceramic interconnect structures. The '042 application generally describes inventible art relevant to the construction of power management circuit modules using embedded passive components fabricated by means of a low-temperature aerosol spray and/or wax-based inkjet technique on the surface of a semiconductor device or sacrificial substrate.

de Rochemont et al. (U.S. Pat. Nos. 5,707,715; 5,866,252; 6,027,826; 6,037,068; 6,143,432; 6,323,549; 6,553,646; 6,742,249 teach that liquid precursor deposition techniques that first establish a metalorganic liquid film that is subsequently dried, pyrolyzed and crystallized using subsequent process treatments impose fundamental limitations on the microscopic quality of the resultant films initiated by the sequential reaction of multicomponent metalorganic precursors contained within the liquid precursor solution.

Nanotechnology has long promised to establish new manufacturing standards through the introduction of novel functional properties that are uniquely observed when the size of a given material is constrained to nanoscale physical dimension. In short, the functional properties of essentially all materials are observed to change dramatically when their physical size is reduced to nanoscale particles. For instance, copper, which is an exceptional electrical conductor in bulk dimensions, becomes highly insulating as a nanoscale particle. Other material systems that are not extraordinarily useful in bulk dimensions demonstrate very unique and exotic properties at the nanoscale that have enabling value in the design of higher technology systems and components. Unfortunately, materials only have economic value when they are physically large enough to be useful in a marketable application. Particles that are 10-70 nm in diameter have shown limited economic promise since conventional sintering methods used to fuse them into bodies that are physically large enough to be usefully applied produce microstructures that diminish or destroy their nanoscale functional properties. Therefore, a highly efficient, high-speed manufacturing process to produce materials that have macroscopic physical dimension but are simultaneously endowed with nanoscale functional properties is highly desirable and is a preferred embodiment of the present invention.

In general, compositionally complex materials are endowed with functional properties that are superior to their lower complexity analogues. Compositionally complex materials are more difficult to make and consequently suffer process lower yields because it is difficult using methods available through the prior art to maintain chemical uniformity of the desired complex composition at the atomic scale throughout the processed material body. Atomic-scale chemical uniformity becomes progressively more important as manufacturing tolerances tighten and the device feature sizes shrink, or when it is an objective of the manufacturing system to control grain size of the fabricated material to physical dimensions that are less than or equal to 50 nanometers (nm). A lack of atomic-scale chemical precision is the direct cause of morphological phase separations which lead to an uneven distribution of functional properties in the material, loose tolerances on components produced therefrom, and lower reliability in the systems and processes in which the materials or components are ultimately used. Therefore, it is highly desirable and preferred embodiments of this invention to develop methods and apparatus to manufacture articles that have higher performance, compositionally complex materials, characterized by atomic-scale chemical uniformity without condition on the desired level of chemical complexity, as a free standing body or integrated into a value-added product as a deposited layer or laminate.

It is also desirable to develop novel manufacturing methods that reduce the number of processing steps to minimal levels and enable a high degree of process automation when integrating compositionally complex or mismatched materials into high value-added physical structures or free-standing bodies.

Often higher performance value materials cannot be integrated into higher value products and/or devices because they are "mismatched" to the substrate, so product designs are limited to a smaller set of non-mismatched materials that can be integrated together using conventional manufacturing methods. It is therefore desirable to have a method of manufacture and apparatus for said method that allows mismatched materials to be integrated into a solid composite body.

Additionally, the methods claimed by the prior art have limited solid oxide deposition rates, typically on the order of several microns per hour or less. The present invention addresses these shortcomings by detailing apparatus that aerosolize liquid precursor solutions into the deposition chamber as a liquid aerosol rather than a gasified vapor, and, further, instructing methods to design said deposition chamber to have a thermal energy profile such that said liquid aerosol is transformed into an aerosol of waxy nanoparticles that, in turn, decompose on, or in the immediate vicinity of, the substrate heat to temperatures that cause the simultaneous decomposition of all molecular precursors. The invention thereby provides a means to produce thin film, thick film, and bulk material with atomic-scale chemical uniformity throughout the deposit, and, thereby, better control over grain size by establishing conditions for more uniform chemical kinetics at potential nucleation sites. Furthermore, the invention achieves higher deposition rates, on the order of mils, or tens of microns, of deposited oxide material per minute.

Reference is now made to FIGS. 1-4 to clarify the salient features and benefits of the present invention, relative to the prior art, and preferred embodiments derived thereform. FIG. 1 depicts the thermogravimetric (TGA) analysis plot of a liquid precursor solution that can be used to prepare compositionally complex bismuth-cuprate (Bi—Pb—Sr—Ca—Cu—O) superconducting ceramic. The lower curve 100 depicts how the weight of a droplet of liquid precursor solution changes as a function of temperature. The upper curve 102, which is the first derivative of 100, is used to characterize the solvent evaporation temperature 104 and decomposition temperatures 106, 108, 110 of the copper, alkaline earth elements (calcium and strontium), and heavy metal element (bismuth and lead) metalorganic precursors, respectively. While a variety of metalorganic or organometallic compounds, such as carboxylate salts, alkoxides, metal alkyls, or β-ketonates, can be used as components to liquid precursor solutions, low volatility carboxylate compounds, such as 2-ethylhexanoates dissolved in 2-ethylhexanoic acid is a preferred embodiment of the invention for the following reasons. First, these metalorganic compounds are essentially non-volatile and will decompose over a very narrow range of temperatures 112 and are essentially non-volatile. As shown in FIG. 1, 2-ethylhexanoate compounds formed with transition-metals, such as copper, will have decomposition temperatures 104 at or around 250° C. Similarly, 2-ethylhexanoates formed with alkali metals and alkaline earth metals, such as lithium, and calcium and strontium, respectively, will have decomposition temperatures 106 and 108 ranging between 250° C. and 300° C., while 2-ethylhexanoates formed with heavy-metal elements will decompose between 300° C. and 350° C. The extremely low volatility of 2-ethylhexanoate compounds makes it extremely difficult to gasify them for general CVD purposes. It also predisposes these molecular compounds to deflagrate rather than evaporate from a surface upon which they have been immobilized. That is, when heated in oxygen atmospheres to temperatures greater than their decomposition temperatures, the organic ligands in these compounds will spontaneously combust into carbon dioxide, carbon monoxide, water, and lower rank alkyl groups without carrying away the precursor's metal atom, which is subsequently deposited on the substrate surface in elemental form or as a metal oxide depending upon the enveloping gas atmosphere during the decomposition process. These precursor characteristics, (the extremely low volatility and the narrow range of decomposition temperatures 112), allows a liquid precursor cocktail comprised of an arbitrary wide variety of elemental metalorganic precursors to be mixed at the molecular level and transported to a substrate surface and decomposed with much higher degrees of chemical uniformity and compositional control than is available with the conventional ALD, PVD or CVD processes, or their plasma-enhanced variants.

The manner in which the liquid precursor solution is applied and decomposed is a critical distinction that delineates important quality distinctions between LCD and MOSD processes. Both processes utilize liquid precursor solutions to immobilize metalorganic precursors on a substrate surface. Both processes provide means to mix the metalorganic precursors at the molecular-level in liquid precursor solutions to ensure a higher degree of compositional control and chemical uniformity than is possible using standard industrial processes. Both processes decompose the immobilized metalorganic precursors on the substrate surface to form material deposits of arbitrarily high chemical complexity and compositional control. The principal distinction lies in the manner in which the precursors are decomposed and the improved scale of compositional uniformity that is gained thereby.

Figure 2A:
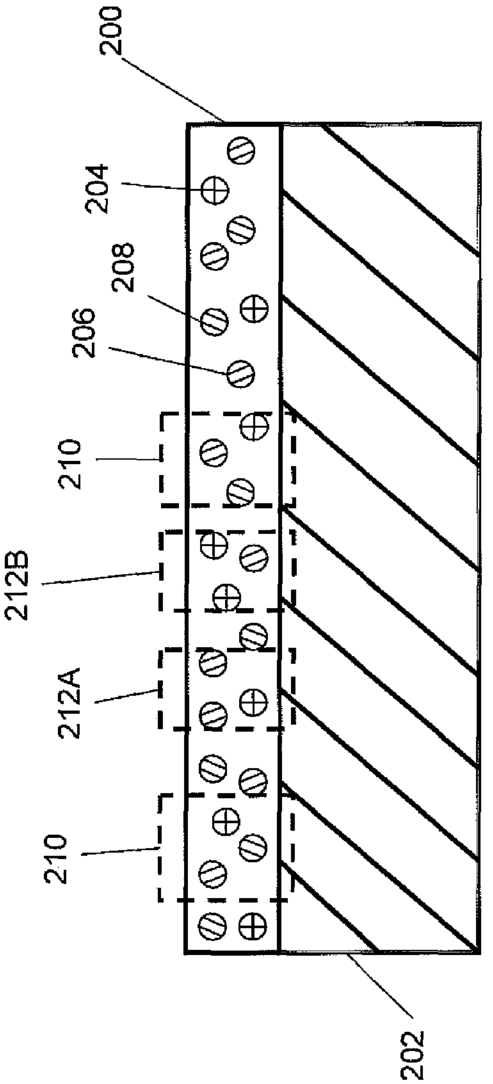
FIG. 2A depicts a sectional view of a substrate and deposited material constructed by a prior art method.

MOSD methods immobilize the metalorganic precursor(s) initially as a liquid film that is necessarily formed at ambient temperature by dipping, spraying, spin coating, or any similar method that forms liquid films. The liquid film is then exposed to a thermal environment producing temperatures (200° C. to 500° C.) that subsequently decompose the metalorganic precursors into their elemental or metal oxide analogues to form the deposit. MOSD techniques allow for the use of metalorganic precursors that can fully discompose over a narrow range of temperatures 112 as shown in FIG. 1. However, MOSD cannot prevent the "sequential decomposition" of metalorganic precursors as the substrate surface is ramped process temperature from ambient environments to temperatures beyond the decomposition of the most thermally resilient metalorganic precursor. Sequential decomposition causes metalorganic precursors that decompose at lower temperatures to convert to their elemental or metal oxide equivalents before the other metalorganic precursors that decompose at higher temperatures. As depicted in FIG. 2A, sequential decomposition causes distinct single element phase-separated domains to be formed in the deposited material 200 so applied to the substrate 202. The lower decomposition temperature precursors will decompose and drop out of solution, and cluster into separated "lower temperature" single element phase-separated domains 204 before the decomposition process is started among the other precursors in the remaining liquid film. Lower temperature single element phase-separated domains typically comprise elemental clusters of transition-metal or transition-metal oxides. Similarly, precursors with mid-range decomposition temperatures will decompose, drop out of solution, and cluster into "middle temperature" phase-separated domains 206. Mid-range phase domains would typically include phase-separated clusters of alkali and alkaline earth metals or metal oxides. These will form before the remaining "higher temperature" phase domains 208, would typically constitute phase separated clusters of heavy-metals or heavy-metal oxides.

These distinct separated phase domain clusters 204, 206, 208 will typically have nanoscale dimension and generally are randomly dispersed throughout the deposit. Their nanoscale dimension allows them to sinter into the desired composition with a higher degree of compositional uniformity than is possible through powder processing. Random distributions will create compositionally balanced micro-volumes 210 throughout most of the deposit. These compositionally balanced micro-volumes 210 locally contain aggregate atomic distributions with the precise composition of the desired crystalline even though the aggregate atomic distribution is subdivided into distinct single-phase domain clusters 204, 206, 208 within the micro-volume. The compositionally balanced distribution within these micro-volumes favors chemical kinetics that will produce the desired crystalline phase when driven through the nucleation process through the subsequent application of thermal energy. However, even random distributions will also create a number of compositionally unbalanced micro-volumes 212A, 212B within the deposit, where the sequential decomposition process has generated groupings of separated phase domain clusters 204, 206, 208 that collectively do not contain aggregate distributions with the precise composition of the desired crystalline. Since the compositionally unbalanced micro-volumes 212A, 212B contain local deficiencies and excesses of one or more of the distinct single-phase domain clusters, they will not produce the desired crystalline locally within their micro-volume during a subsequent nucleation process. These compositionally unbalanced micro-volumes 212A, 212B generate morphological phase separations within the deposit, which are observed as distinct material phases and/or non-uniform grain size distributions within the deposit. They also locally alter the deposits functional properties, which deteriorates the tolerance that can be held in components fabricated from these materials.

Faster thermal ramping rates can minimize the physical lengths and quantity of the separated single phase domain clusters, but generally produce deposits that have very poor cosmetic quality because the solvent and precursors literally boil from the surface, which is not suitable for most applications.

Figure 2B:
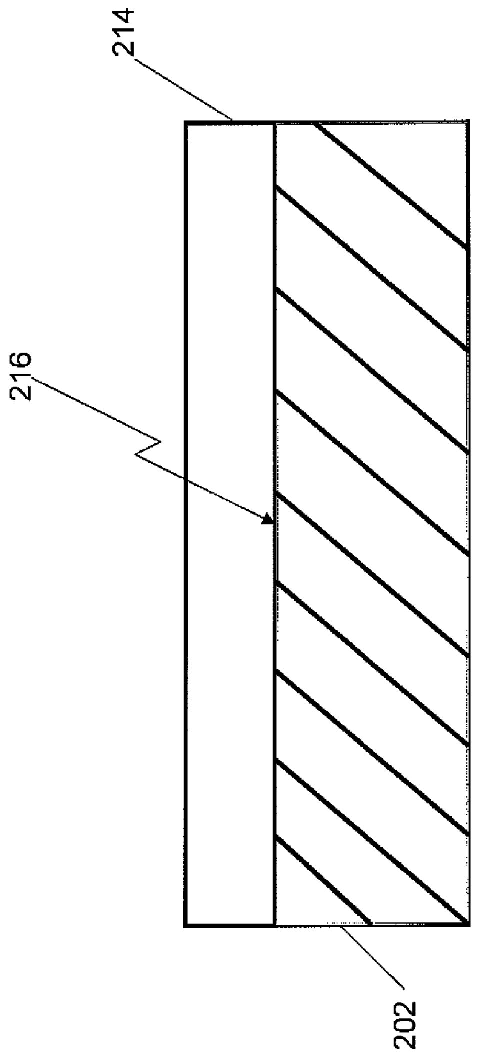
FIG. 2B depicts a sectional view of a substrate and deposited material constructed in accordance with one embodiment of the present invention.

LCD circumvents these deficiencies in the prior art through the simultaneous decomposition of metalorganic precursors as they are immobilized on the substrate surface. As discussed in greater detail below, this prevents the occurrence of single element phase-separated domain clusters 204, 206, 208, thereby ensuring the material deposit has an aggregate composition that is replicated throughout all micro-volumes of the solid at the atomic-scale. This is achieved by heating the substrate before applying the liquid precursor solution as an aerosol spray. The substrate 202 should be heated so that its deposition surface 216 has a surface process temperature sufficient to cause all of the metalorganic precursors applied to it to undergo instantaneous decomposition simultaneously. As illustrated in FIG. 1, a range of sufficient substrate surface process temperatures 114 can be determined by thermogravimetric analysis. The lower bound of the surface process temperature range 116 is slightly higher than the decomposition temperature of the most thermally resilient metalorganic precursor 110. The upper bound of the surface process temperature range 118 is generally determined by the cosmetic quality of the deposited film. However, it is a preferred embodiment of the invention that the upper bound be well below (~100° C.) any nucleation processes that cause the deposited material to crystallize. This range of surface process temperatures 114 allow the deposit to form as an amorphous solid with atomic-scale chemical uniformity 214 on the substrate 202 deposition surface 216 as shown in FIG. 2B. While this range of surface process temperatures 114 will be dependent upon the composition of liquid precursor solution, it can be generally stated to lie within the range of 200° C. to 600° C., and preferably within the range of 250° C. to 400° C.

Figure 3A:
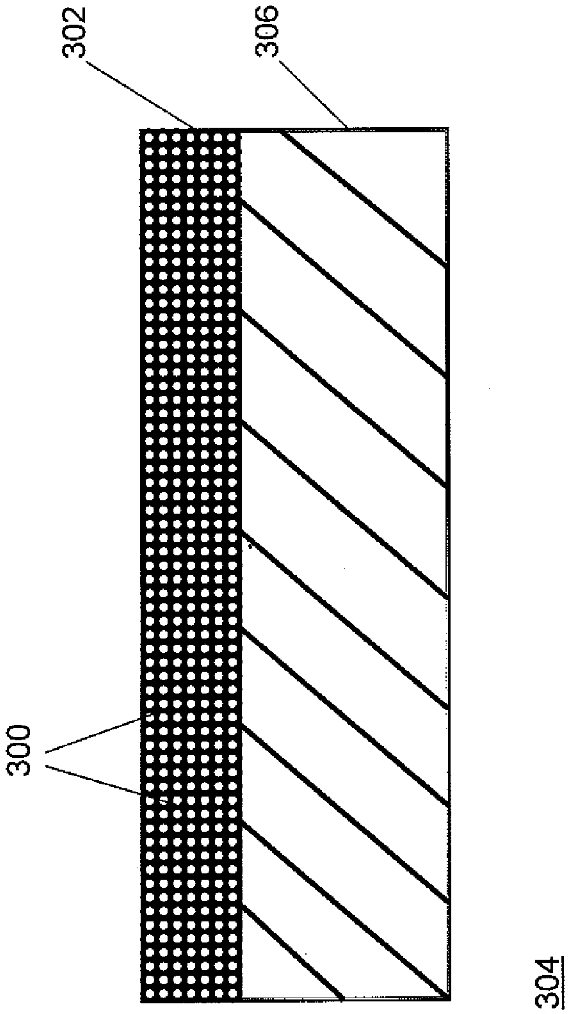
FIGS. 3A,3B illustrate side views of a substrate and deposited material constructed in accordance with another embodiment of the present invention.
Figure 3B:
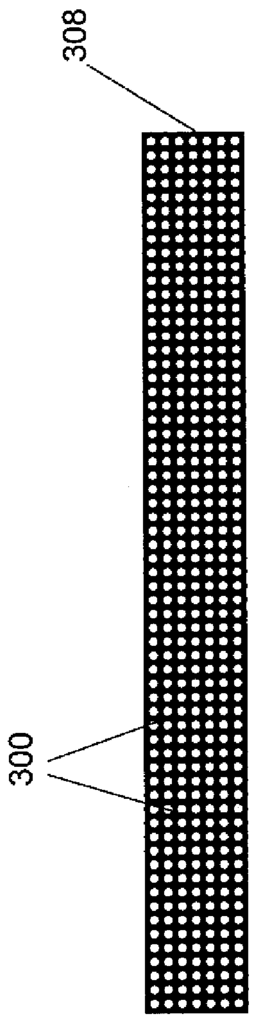

The ability to use LCD to first form a chemically precise amorphous deposit with atomic-scale compositional control serves two principal objectives that have great inventive value. As illustrated in FIGS. 3A and 3B, the absence of any crystalline phase in the deposit allows the formation nanoscale microstructures 300 in the deposited material 302 through the subsequent application of thermal energy sufficient to initiate nucleation processes within the amorphous deposit, but of short enough duration to limit the microstructure so developed to have grain size less than 100 nm, preferably less than 50 nm. The nucleating thermal energy may be applied by inserting the entire composite body 304, consisting of the deposited material 302 and the substrate 306 into an oven that applies thermal energy to all parts of the composite body 304, or through the application of a rapid thermal annealing process that principally heats deposited material 302. The application of a rapid thermal annealing process, preferably an ionized plasma annealing process is a preferred embodiment of the invention since it provides greater control over the surface process temperature and its duration. The nucleating thermal energy for a given deposited material 302 will be dependent upon the deposit's chemical composition. However, it can be generally held that the nucleating thermal energy should produce substrate or surface process temperatures in the range of 600° C. to 1200° C. The duration of the nucleating thermal energy should be less than 10 minutes, preferably less than 5 minutes if applied through means of an oven, and should be less than 60 seconds, preferably less than 30 seconds if applied by means of a rapid thermal annealing process.

The present invention thereby allows the deposited material 302 to comprise a material body of macroscopic dimension that is sufficiently large enough to have economic value that is simultaneously endowed with the functional properties of its nanoparticle equivalent since its microstructure has been processed to comprise a dense network of nanoscale grains 300. The deposited material 302 may comprise a complex metal or superalloy or a complex semiconductor, such as copper indium gallium selenide (CIGS), which is useful in architectural solar cell glass. In this instance, the LCD aerosol is applied to the substrate 304 in a chemically reducing gas atmosphere, comprising and inert gas, including by not limited to argon, helium, nitrogen, or an inert gas that is mixed with hydrogen or carbon monoxide, or a chemically reducing partial pressure admixture of carbon dioxide and carbon monoxide, or other reducing gas agents. The deposited material 302 may comprise a complex ceramic or electroceramic. In this instance, the LCD aerosol is applied to the substrate 304 in an oxidizing atmosphere consisting of oxygen, an inert gas mixed with oxygen, a chemically oxidizing mixture of carbon dioxide and carbon monoxide partial pressures, or an inert gas mixed with a chemically oxidizing mixture of carbon dioxide and carbon monoxide partial pressures.

The deposited material 302 may integrated into a higher value product by remaining as a laminate on the substrate surface. Alternatively, as shown in FIG. 3B, if a sufficient amount of material is deposited on a sacrificial substrate to be self-supporting, the substrate can be subsequently separated to produce a self-standing material body 308 that has nanoscale microstructure 300 and functional properties.

Figure 4A:
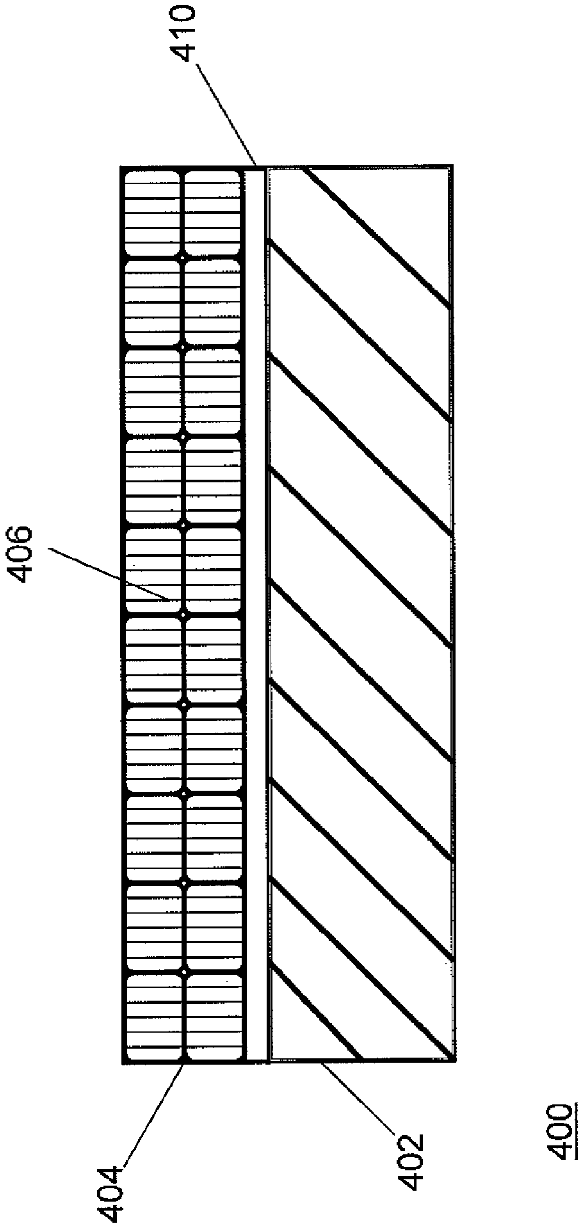
FIGS. 4A,4B illustrate side views of a substrate and deposited material constructed in accordance with yet another embodiment of the present invention.
Figure 4B:
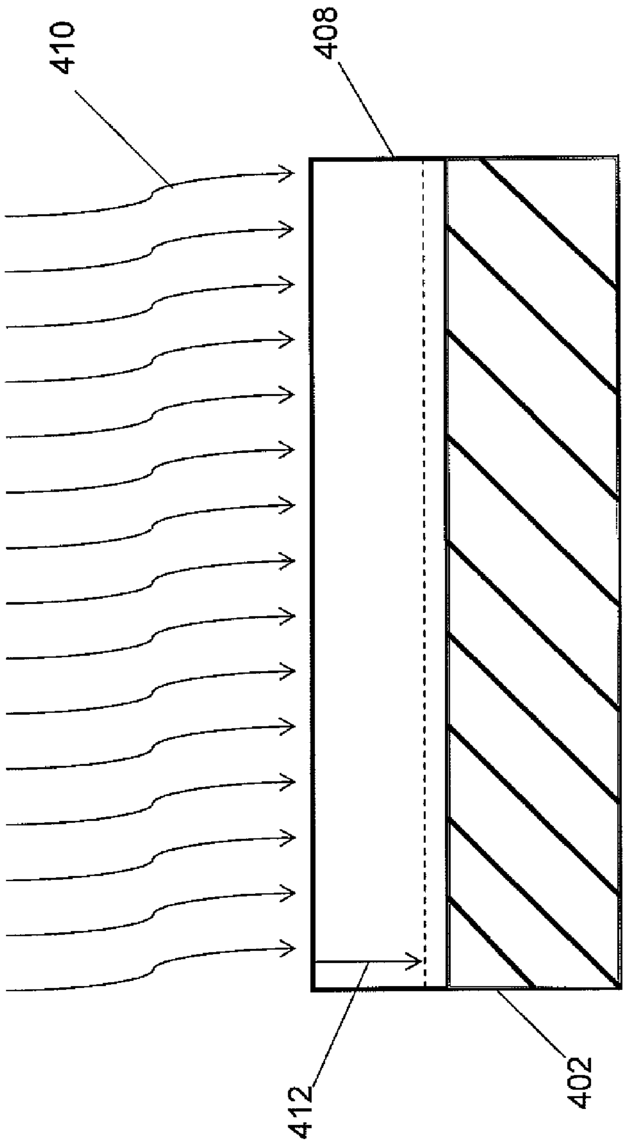

Reference is now made to FIGS. 4A, 4B to illustrate another embodiment of the invention that permits the development of a composite body 400 that comprises a substrate 402 that has a mismatched material 404 deposited on one or more of its surfaces. The mismatched material may contain a microstructure 406 of arbitrarily large dimension. That is, it may have grain sizes ranging from 1 nm to 500 micron. The composite body is processed by first applying an amorphous LCD deposit 408 upon the substrate 402, and subsequently applying a rapid thermal annealing process 410, preferably by means of an ionized plasma, that has sufficient thermal energy to raise the surface process temperature of the amorphous LCD deposit to nucleating temperatures. However, the duration is limited to durations ranging between that are short enough to prevent the nucleating processes from penetrating beyond a penetration depth 412 that is less than the thickness of the amorphous LCD deposit 408. This allows an amorphous boundary layer 414 to serve as a mechanical interface between the two mismatched materials. The surface adhesion of the amorphous boundary layer 414 to the substrate 402 has always been shown to be stronger than the tensile strength of the mismatched material 404.

Figure 5:
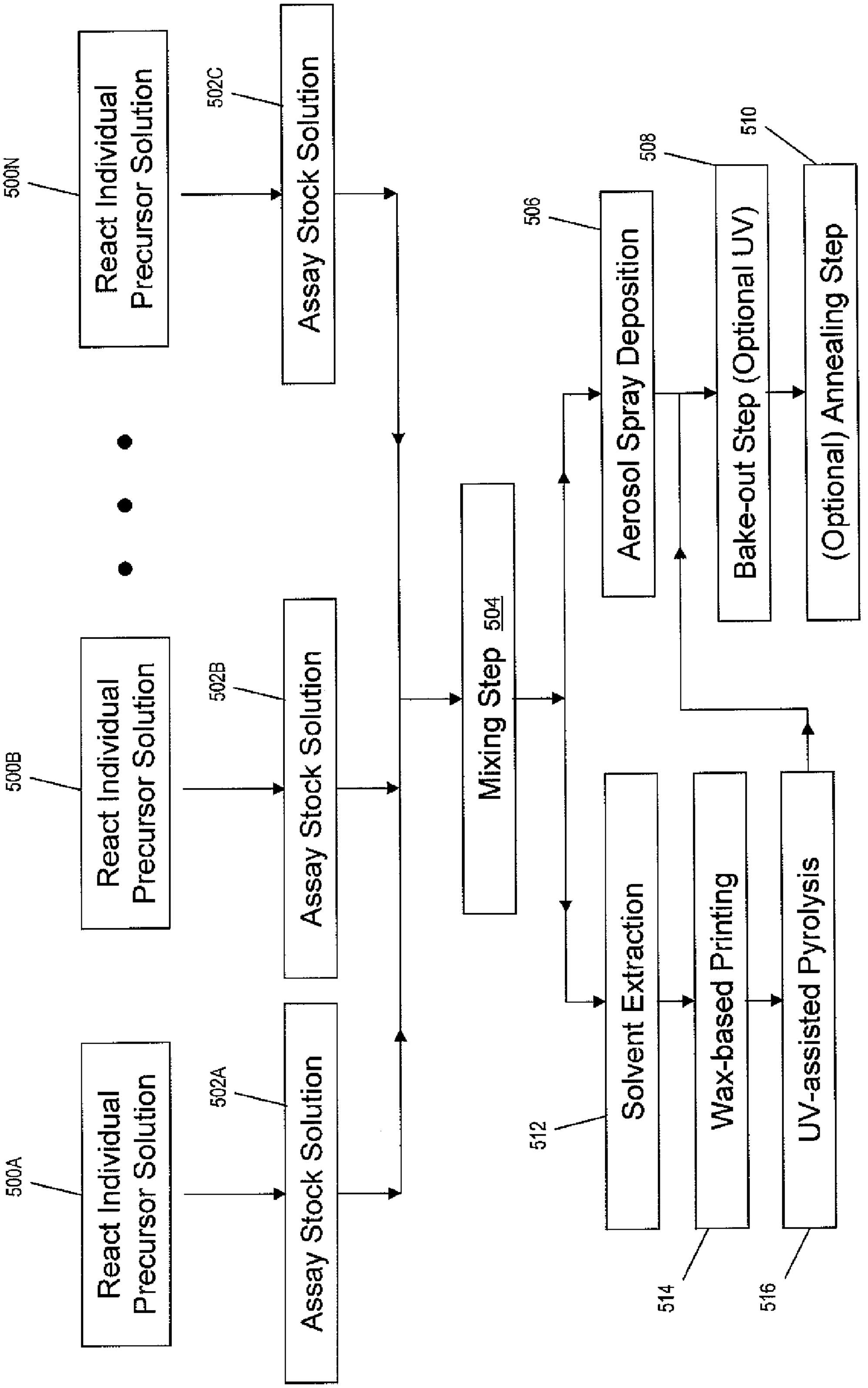
FIG. 5 depicts the LCD process.

Reference is now made to FIGS. 5-12 to better describe the LCD process and preferred apparatus to implement the process. The LCD process provides methods to deliver a plurality of LCD precursor materials as a single layer or in selective locations across the substrate surface. As shown in FIG. 5, LCD materials fabrication starts with a solution preparation step that consists of reacting the metal precursors with a carboxylic acid solvent, preferably a carboxylic acid of rank 5 or higher, to form a carboxylic acid salt solution 500A, 500B, . . . , 500N for each chemical element incorporated into the final deposit. Although carboxylates are the preferred precursor chemistry, the LCD process is not limited to using liquid precursor solutions exclusively made with carboxylates. In some instances, it is preferable for reasons of materials purity or chemical stability to use alkoxide or β-ketonate precursors provided they are soluble with the other metalorganic salts.

A single component solution is used when the objective is to fabricate a single component (one metal oxide), a plurality of single component solutions are prepared when it is desirable to synthesize a mixed metal oxide material. Two carboxylic acid salts, 2-ethylhexanoate and neo-decanoate, are preferred for their superior liquid film forming and efficient pyrolytic decomposition properties. A preferred method to form a carboxylate salt involves driving an exchange reaction between said carboxylic acid with an initial high volatility lower rank metal precursor, such as an acetate salt, through vacuum distillation and filtering. While acetate salts represent a suitable lower rank precursor for use in the LCD process, other lower rank high volatility precursors can be used without restriction. Certain metals or semi-metals, such as titanium or silicon, have a very strong affinity to hydroxyl groups ($OH^-$), and an ideal chemistry for LCD processing can be permanently destroyed if these compounds are exposed to even minute amounts of oxygen or water vapor. In this instance, it is necessary to react these air/moisture-sensitive compounds in a dry, inert gas atmosphere, such as helium, argon, or dry nitrogen and to package, store, and handle the solutions under glove box conditions. In this instance, the inert gas should be introduced as purge gas into the vacuum distillation column.

The reacted solutions are then assayed to determine a precise molar concentration 502A, 502B, . . . , 502N. Inductively-coupled plasma atomic emission spectroscopy (ICP-AES) is the preferred assay method. The assayed solutions are then titrated and thoroughly blended to form a mixed solution 504 that contains a molar stoichiometry known to produce the desired stoichiometry after spray deposition when a multi-component electroceramic is desired. The mixed precursor solution is then filtered once more after blending the plurality of precursors. Solution stoichiometry will differ from the deposit stoichiometry and depend very strongly on specific characteristics of the deposition system. The precursor solution may have to be enriched with certain metal cation concentrations that might be prone to higher loss rates during the deposition process; however, metal cation loss rates are extremely predictable when all process parameters are tightly controlled. Solutions prepared with high rank carboxylate solutions are capable of dissolving high molar concentrations of carboxylic acid salts. Metal densities in solution are more conveniently expressed in terms of their percentage weight of equivalent oxides (wt % equiv. oxide), which allows a quick calculation to determine how much solid oxide material will be created from a given quantity of solution. For instance, 100 gms of a solution that has an 10% wt % equiv. oxide, will produce 10 gms of metal oxide material after the entire quantity of material has been deposited. In general, it is advisable to prepare solutions to have wt % equiv. oxide ranging from 0.001% to 25%, preferably 0.1% to 20%. Dilute solutions (0.001% to 1% wt % equiv. oxide, are preferred when making thin film materials (<1 micron thickness) using liquid aerosol spray deposition. More concentrated solutions, 1% to 25% wt % equiv. oxide, are preferred when fabricating precursor waxes, thick films (1 micron≦deposit thickness<1 mm), or bulk materials (thickness 1 mm). The prepared solution may then be deposited on a substrate heated to temperatures between 200° C. and 600° C., preferably 250° C. and 400° C., using a liquid aerosol spray 506 for curtain coating processes, or for blanket coating processes when it is intended to completely cover the substrate surface area. The deposition is then followed by a bake out step 508 at temperatures ranging between 400° C. and 650° C., preferably 400° C. and 450° C., to remove any residual organic material remaining in the deposit after the deposition process. Controlled gas atmospheres comprising dry air, an inert gas, such as nitrogen, helium, argon, or others, with or without partial pressure redox gases, such as oxygen, or mixtures of carbon monoxide and carbon dioxide may be applied during the aerosol spray and bake out process to control the oxidation state in the deposited material, to accelerate the removal or residual organic compounds or to protect reactive surfaces on the substrate or deposit.

The bake out step 508 may also comprise a rapid thermal annealing step. Most often, the deposited material remains as a solid solution with no visible crystallization after the bake out step 508. When it is desirable to render the deposited material into an advanced state of crystallization with a precisely controlled microstructure an optional annealing step 510, preferably a rapid thermal annealing step, is applied. It is further preferred that the optional rapid thermal annealing step consist of an ionized gas plasma using a controlled gas atmosphere for the same reasons as cited above.

Figure 6:
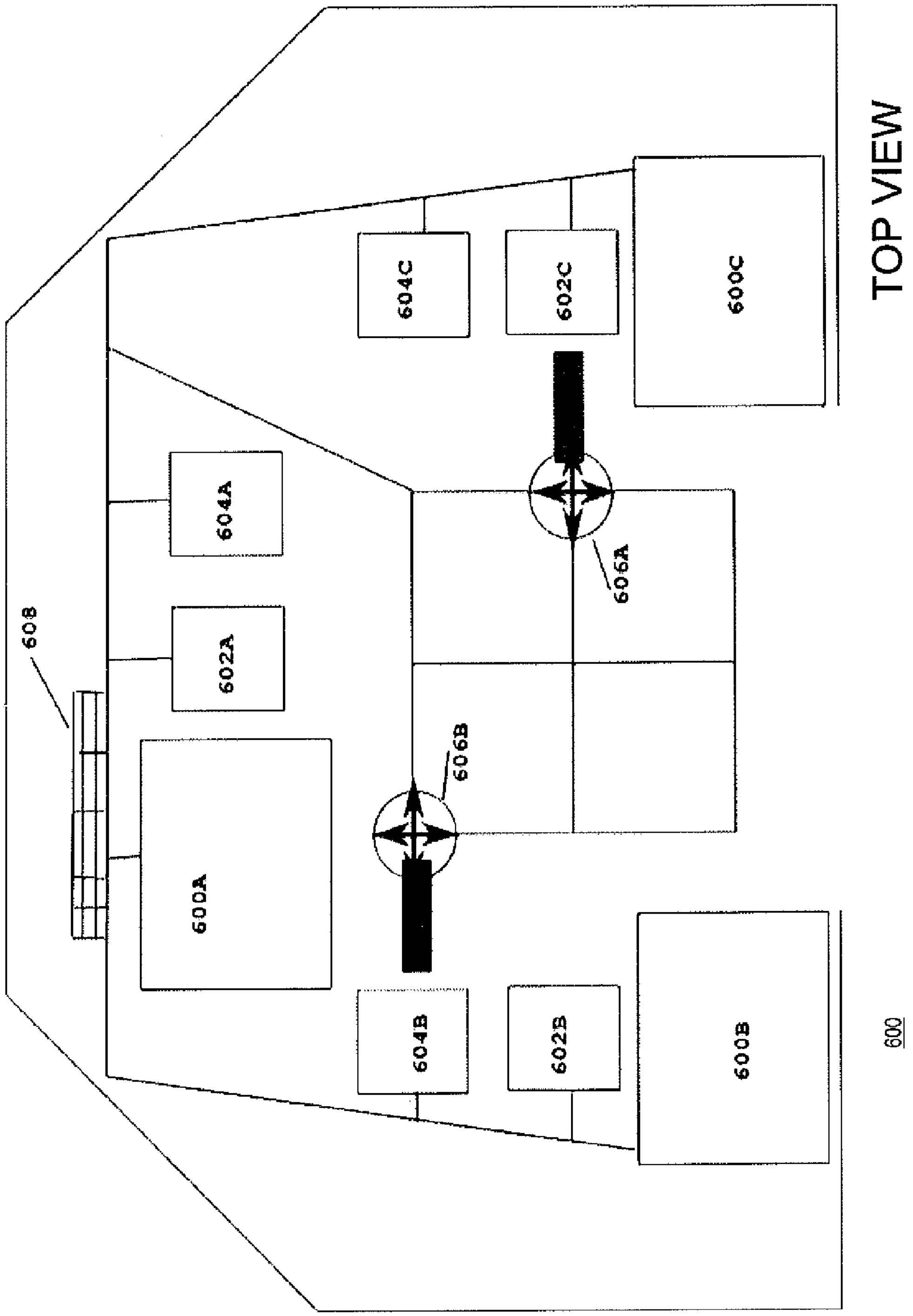
FIG. 6 shows an overall top view of the LCD apparatus and its general layout.

Reference is now made to FIGS. 6 through 13 to describe apparatus that optimally implements the LCD process. FIG. 6 shows an overall top view of the apparatus 600 and its general layout with at least one spray deposition station 600A, 600B and 600C, at least one bake-out station 602A, 602B and 602C, and at least one optional rapid thermal annealing station 604A, 604B and 604C, robotic placement devices 606A and 60613 and the general network layout 608 for power, gasses, control systems and chemical routing. The optional rapid thermal annealing station, preferably an ionized plasma annealing station, is only used when it is desirable to crystallize the amorphous LCD deposit into a advanced or controlled microstructure. While it is possible to integrate all of these functions into a single processing chamber, economic metrics are improved when using a robotic system that shuffles substrates between process-specific chambers to permit the simultaneous processing of multiple substrates. For that purpose, network layout 608 may include all necessary computer and robotic controls for complete automation of apparatus 600. The apparatus as described can have its process sections and robotic control systems connected by various 10 busses to one or more central processors such that the movement and processing of the formed materials can be optimized. The processor(s) may be situated in traditional computer or programmable logic machines. Additionally, other types of logic hardware and software suitable to the task may be utilized.

Figure 7:
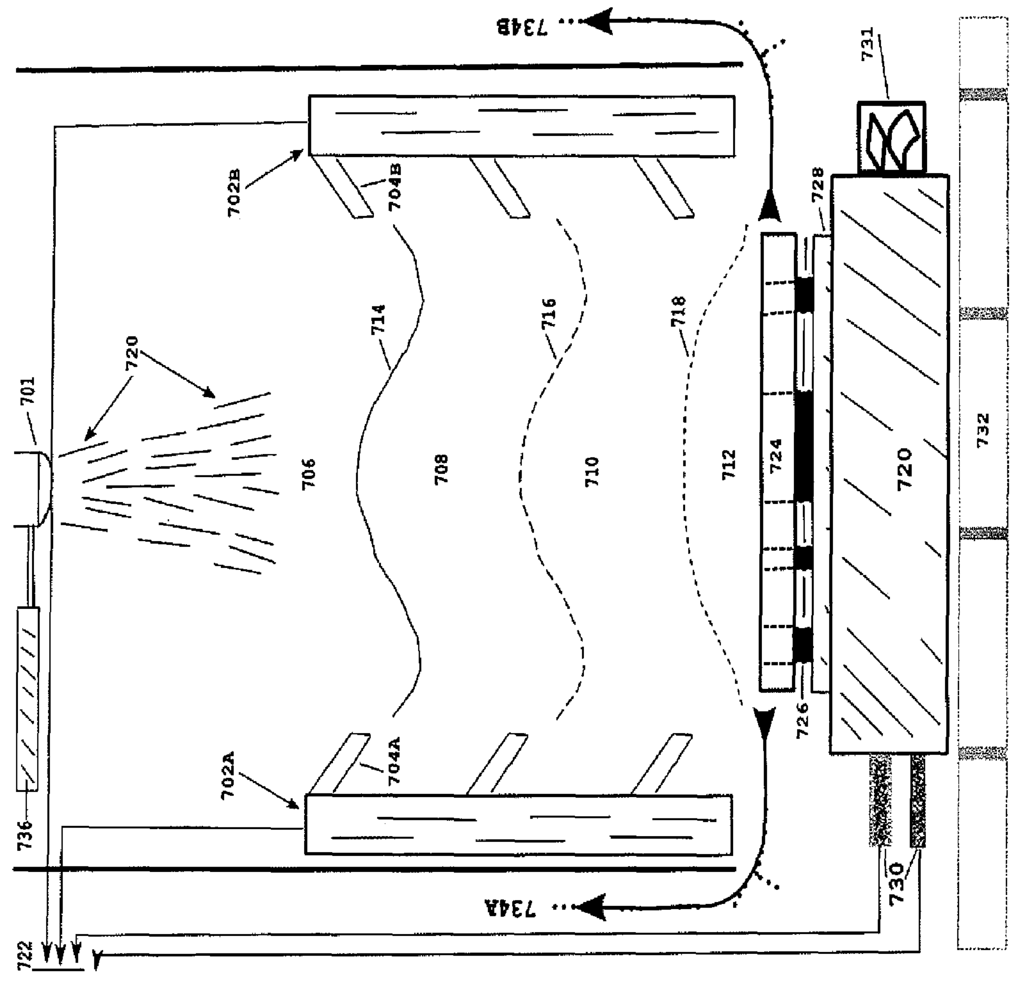
FIG. 7 is a depiction of the Deposition Process Chamber and the general hardware and process sections contained within.

FIG. 7 is a depiction of the Deposition Process Chamber 700 and the general hardware and process sections contained within. A liquid chemical precursor solution is aerosolized and projected into the chamber using a spray nozzle assembly 701 to form a liquid aerosol. The chemical precursor solution may be provided to nozzle assembly 701 by any suitable source. Thermal sources 702A and 702B, contained within side panels, are angle adjustable infrared (IR) heaters used to create internal process areas that facilitate precursor decomposition. IR heaters are protected from aerosol overspray by louvers 704A and 704B. The internal process areas are preferred embodiments, but not an essential requirement of the invention.

Internal process areas 706, 708, 710, 712 are characterized by isotherms 714, 716, 718 that delineate boundary layers to distinct phase regions of the LCD aerosol spray within the LCD spray chamber 700. The first isotherm 714 is preferably set to a temperature between 120° C. to 180° C. that depends on the chemistry of the liquid precursor solution applied within the spray chamber 700. The objective of the first isotherm 714 is to create a distinct phase boundary between internal process area 706 and 708 such that any solvent contained within a droplet of the aerosolized liquid precursor solution 720 will begin to evaporate from the droplet as it passes from internal process area 706 into internal process area 708. The third process area 710 is delineated by isotherm 716, which is greater than 200° C. Isotherm 718, represents a phase-space within spray deposition chamber 700 where the solvent is substantially evaporated from the aerosolized droplet. As mentioned above, the use of carboxylate precursors, in particular 2-ethylhexanoate and neodecanoate precursors, are preferred liquid precursor chemistries for the LCD process because their low volatility (essentially zero) allows the solvent to be evaporated from the metalorganic compound as shown by peak 104 in FIG. 1. Furthermore, these long-chained organic compounds exert strong Van der Waals forces that keep the molecular-level subdivision of disparate metalorganic compounds intact within the waxy particles that remain as the solvent is evaporated from the liquid aerosol droplets. The fourth internal process area 712 situated between isotherm 718 and the substrate pedestal 720, which is heated to a temperature ranging between 200° C. and 500° C. Internal process area 712 may initiate the simultaneous decomposition of the waxy precursor particles as the metalorganic precursors are immobilized on the substrate surface. The LCD process' ability to maintain the mixed precursors as intact waxy particles with a precise metalorganic stoichiometry that is subdivided at the molecular-level immediately prior to the simultaneous decomposition of all the precursors is the method that provides the pathway through which a material deposit with precise composition and atomic-scale elemental uniformity is formed on the substrate surface.

Additional systems 722 (shown as a generalized schematic) that make up to the spray chamber include the Power Supply, Temperature Sensor and other Control Signals to and from the CPU/Controller busses. Additional hardware components within the spray deposition chamber 700 are:

The (optional) pattern mask 724 through which the material is sprayed to form deposits 726 that are selectively located on the surface of the substrate 728.

The substrate or target 728 upon which the material is sprayed.

A highly accurate substrate temperature controller 730

Means 731 to generate electromagnetic fields on the surface during the deposition process through the pedestal 720 upon which the substrate sits.

A cold trap system 732 in which overspray and other waste materials/decomposition products from the process are collected.

An exhaust system, represented by arrows 734A and 734B, that removes solvent vapors and other light waste from the deposition chamber. and, A gas mixing manifold 736 that is also used to heat the process gases to a temperature in the range of 90° C. and 180° C. to facility the separation of the solvent from the droplets within the spray chamber.

Although the selective patterning of the deposited material 726 on the substrate 728 surface is a preferred embodiment of the invention, it can optionally be removed when a "blanket deposition" over the entire substrate surface is desired.

Figure 8A:
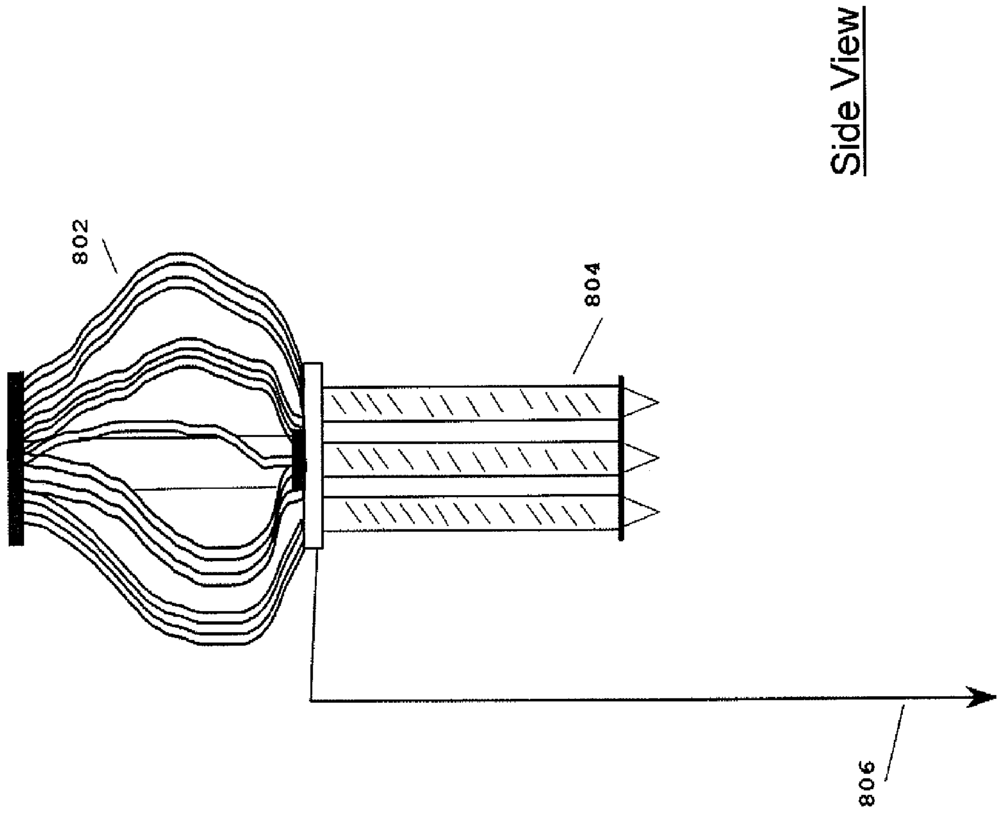
FIG. 8 is a schematic representation of an LCD spray chamber that uses a single spray nozzle.
Figure 8B:
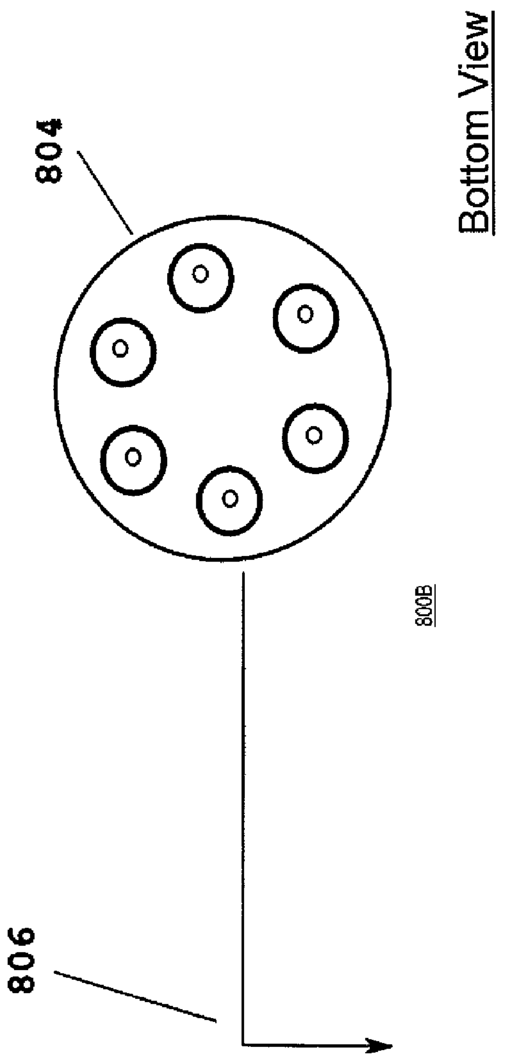
Figure 9:
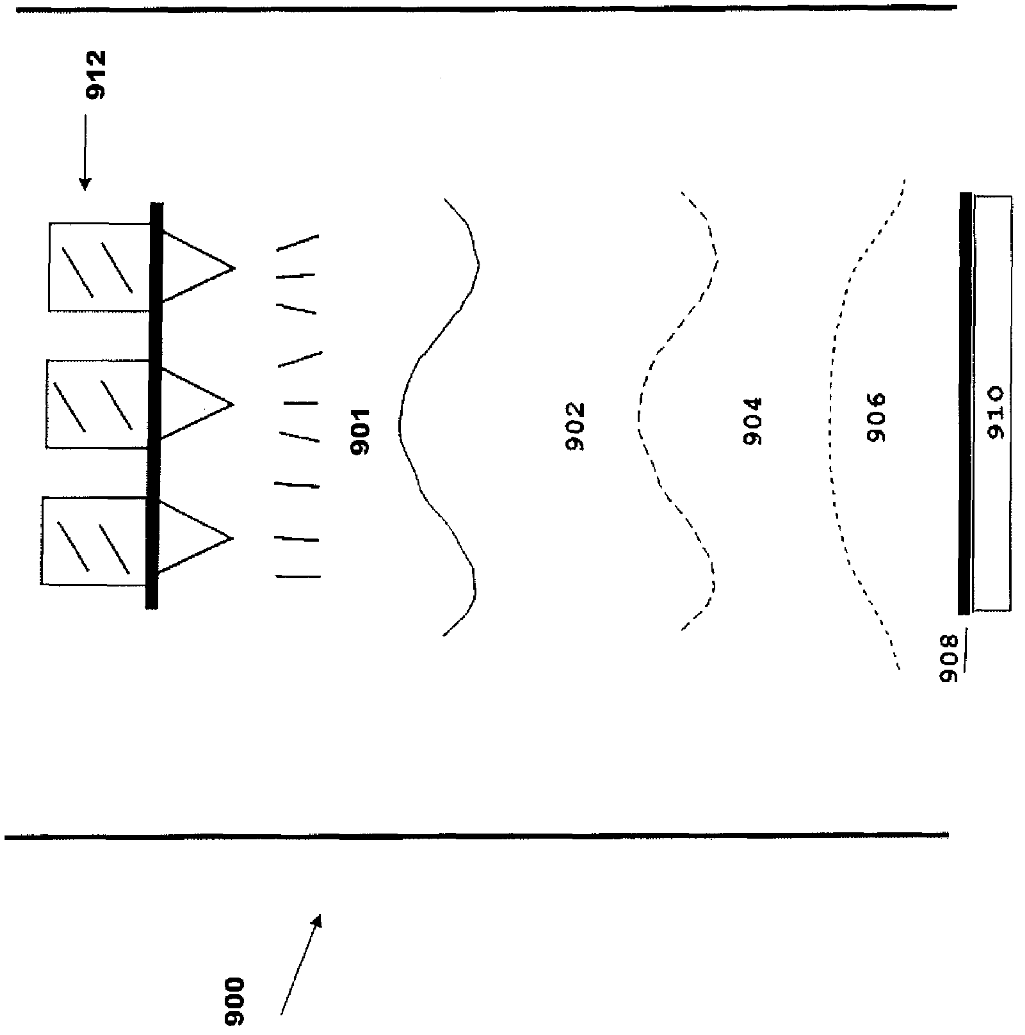
FIG. 9 is a schematic representation of an LCD spray chamber that uses a cluster of spray nozzles.

FIGS. 8A, 8B and 9 are representations of the hardware used in the spray portion (800A (side view) and 800B (bottom view)) of the LCD process. Item 802 represents the various hoses and cabling needed to supply the gasses, and liquid chemistry to the spray nozzle cluster 800A, 800B, while device 804 represents an assembly containing at least one spray nozzle, and means 806 supply the power and control signaling systems.

FIG. 8B represents the bottom view of the spray nozzle assembly 804. While the process described in this invention generally calls for the output of one spray nozzle at varying heights to be able to cover the entire substrate area, the apparatus and process described here also allows for multiple nozzles at uniform, but varying heights to simultaneously dispense the materials across larger areas as demonstrated in FIG. 9. The spray nozzle assembly may also be used to selectively dispense dedicated metalorganic chemistries through a single nozzle within the assembly.

FIG. 9 shows a schematic of a deposition chamber similar to that of FIG. 7 except for the use of multiple spray nozzles. FIG. 9's internal process areas 901, 902 and 904 represent the same internal process areas 706, 708, 710, 712 as represented in the FIG. 7. The deposited material deposited material 908 is more evenly distributed over the substrate 910 using a multi-nozzle system 912 when the LCD process is applied to large area substrates.

Figure 10:
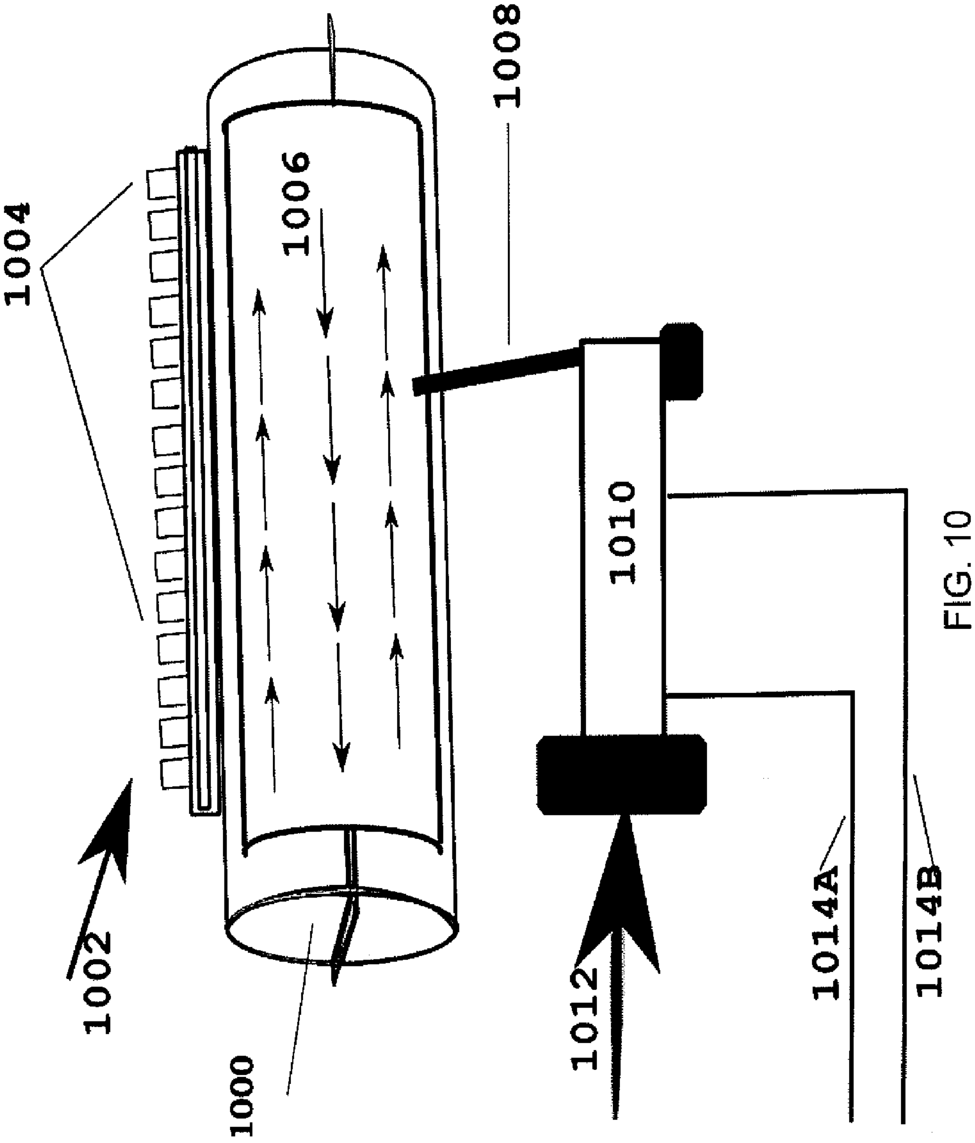
FIG. 10 depicts gas mixing and heater manifolds used in the LCD process.

FIG. 10 is a schematic diagram of gas mixing and heater manifolds that may be used for providing gas to the various spray nozzles described herein. It is a preferred embodiment of the invention to use heated mixed process gases to aerosolize the liquid precursor solution within a resonant air cavity. Directional flow 1002 represents the supply of the various process gasses into the solenoid control valve assembly 1004. Different gasses may be allowed by the solenoid control valve assembly 1004 into the mixing manifold 1000 The mixed gasses 1006 pass from manifold 1000 through the connection 1008 to the gas heater manifold 1010 where they and the dedicated nitrogen purge supply 1012 are heated and dispensed through lines 1014A and 1014B to the nozzle clusters 814 (FIG. 8) and 912 (FIG. 9).

The apparatus herein defined may be operated in continuous or pulsed spray modes. The selection of mixed process gasses applied during the deposition process is dependent upon the redox chemistry of the deposited material and any other materials that may have been pre-deposited on the substrate surface. For instance, it is desirable to use oxygen gas mixtures as an oxidizing agent when depositing complex ceramics. However, if the substrate is composed of copper or has copper selectively deposited on its surface as trace conductors, the presence of oxygen, even in dilute concentrations would destroy the conductive and mechanical properties of copper contained on or within the substrate. It is therefore more desirable to use oxidizing partial pressure ratios of carbon monoxide and carbon dioxide to regulate the spray chamber redox chemistry without altering the state of any substrate components that are readily oxidized or irreparably damaged by oxygen gas.

Figure 11:
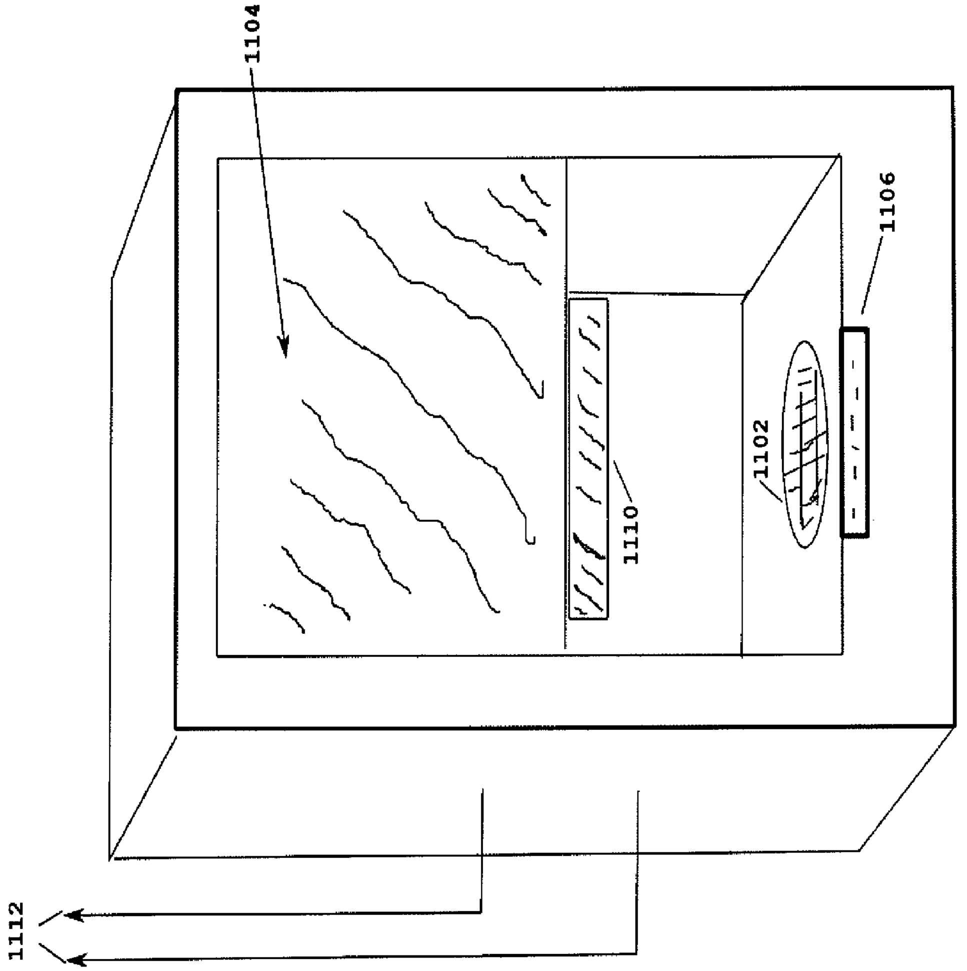
FIG. 11 is a schematic representation of the bake-out chamber that is optionally used by the LCD process.

FIG. 11 is a perspective view of a bake-Out station 1100 of the apparatus which can include any suitable heating device such as a hot plate, oven, IR or electric device capable of producing temperatures greater than 400° C. Bake-out station 1100 is used to remove residual organic matter from the LCD deposit 1102. Bake-out station 1100 is depicted as an oven with a vertically sliding door 1104 and heating element 1106 that is capable of heating the deposited materials 1102 to the desired temperatures ranging from 400° C. to 600° C., preferably 400° C. to 450° C. It is a further refinement to accelerate residual organic matter removal from the deposit 1102 using an ultraviolet light source 1110 located within bake-out station 1100. Items 1112 depict the cabling, hoses and other CPU wiring required to power, heat and control the unit and its atomosphere.

Figure 12:
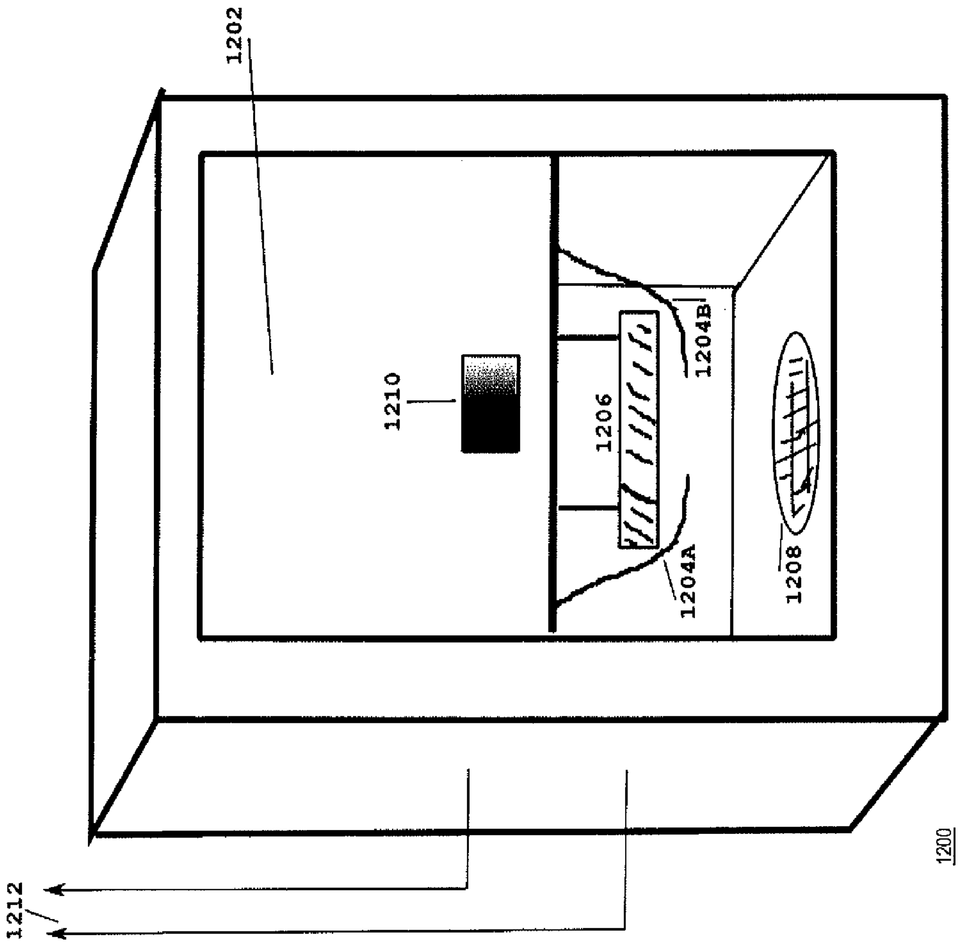
FIG. 12 is a schematic representation of a rapid thermal annealing station that is optionally used by the LCD process to produce crystalline laminates and bodies.

FIG. 12 is a perspective view of an optional rapid thermal annealing station 1200, preferably an ionized plasma annealing station, otherwise known as a Reactive Ion Etch (RIE) device. The rapid thermal annealing station 1200 is equipped with a vertically opening door 1202. This device could also be any of the more standard rapid thermal annealing apparatuses such as a gas, IR or UV oven. The gas feeds 1204A and 1204B and the electrode(s) 1206 are those that are typically used in this type of process to create the plasma, which is then used to anneal the material that has been deposited upon the substrate 1208. As with most RIE devices the viewport 1210 in the vertical door 1202 is standard. Items 1212 represent the cabling and plumbing work needed to control and execute the process.

Figure 13A:
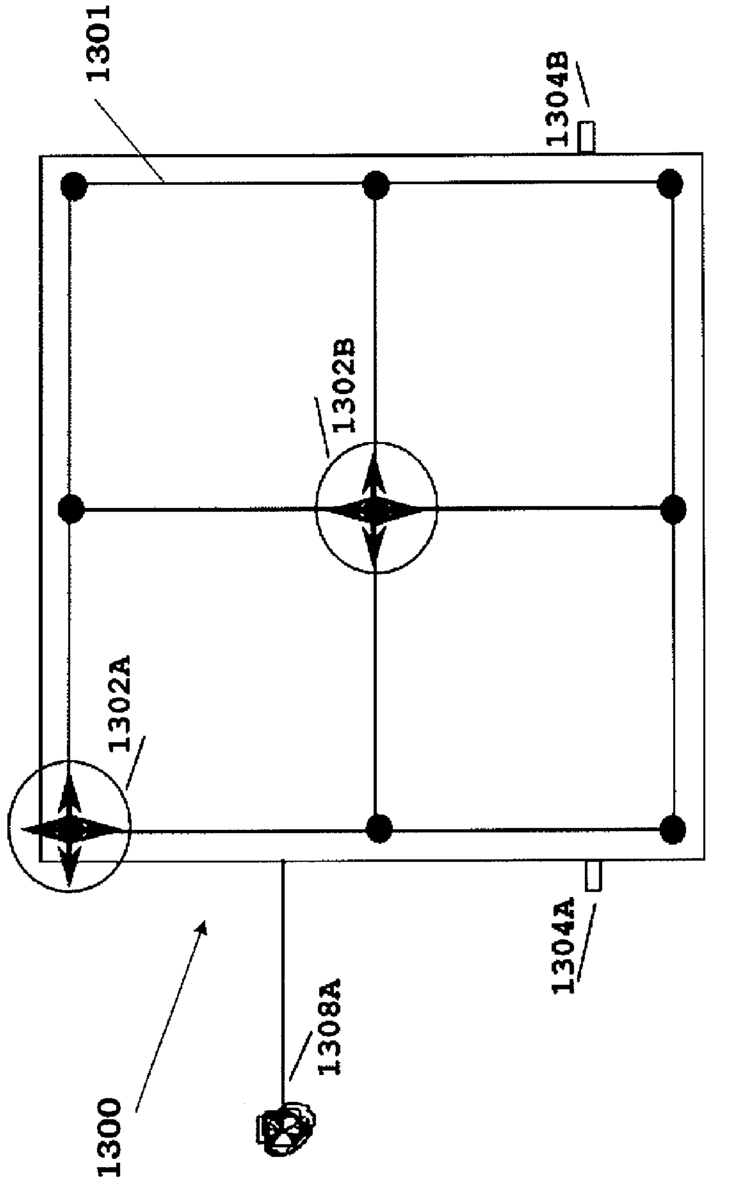
FIGS. 13A,B represent top and side views) of a robotic handler system for loading and unloading substrates at the various stages of the overall apparatus of FIG. 6.

FIG. 13A shows a top view of a robotic substrate transfer cart 1300 having a pair of robotic substrate transfer devices 1302A, 1302B mounted on a track system 1301 for moving substrates between processing stations. Robotic transfer devices 1302A, 1302B may include one or more extendable effectors for engaging substrates and may further be rotatable to enable pickup and placement of substrates in any direction.

Figure 13B:
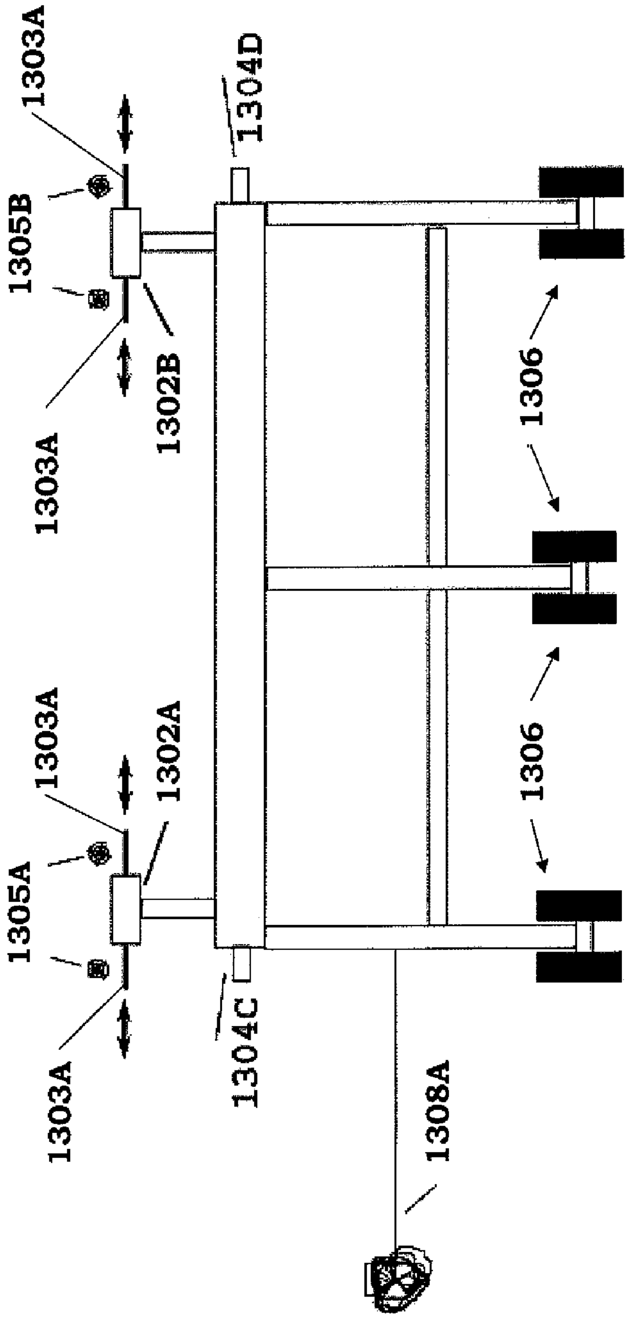

FIG. 13B shows a side view of the cart 1300 wherein robotic device 1302B is located in a different position. Robotic devices 1302A, 1302B are shown in FIG. 13B with two extendable effectors 1303A, 1303B and gas jets 1305A, 1305B. It is sometimes necessary to chemically isolate the surfaces of substrates being transferred on the extendable end effectors 1303A, 1303B to prevent environmental contamination of the surface. This is typically accomplished using gas curtains produced by gas jets 1305A, 1305B. Cart 1300 is mounted on wheels 1306 and moved by motors (not shown) included in card 1300. Coupling 1308A represents the power and control connections to a CPU, sensors and other controllers used for robotic control of the cart 1300. the accurate placement of robotic car at the various stations may further be enhanced with the use of alignment pins 1304A, 1304B. A gas supply for gas jets 1305A, 1305B may be carried internally on cart 1300 or provided through coupling 1308A.

The present invention is illustratively described above in reference to the disclosed embodiments. Various modifications and changes may be made to the disclosed embodiments by persons skilled in the art without departing from the scope of the present invention as defined in the appended claims.

What is claimed is:

1. A method for forming an amorphous material, comprising the steps of:

mixing liquid metalorganic precursors in solution;

projecting a liquid aerosol of the metalorganic precursor solution toward a surface in a deposition chamber having a controlled gas atmosphere;

exposing the projected aerosol to a plurality of internal process areas within the deposition chamber, prior to contact of the projected aerosol with the surface to phase separate and evaporate liquid solvents from the aerosolized metalorganic precursors;

heating the surface to a temperature higher than decomposition temperatures of the metalorganic precursors; and decomposing the metalorganic precursors upon contact with the heated surface to form the amorphous material.

2. The method of claim 1, wherein the step of exposing comprises exposing the projected aerosol to a plurality of radiant energy or thermal sources located on a side of the deposition chamber to create the plurality internal process areas prior to contact with the surface.

3. The method of claim 2, wherein the step of exposing the projected aerosol forms a thermal gradient in a heating field located in the deposition chamber.

4. The method of claim 3, wherein the heating field thermal gradient raises the temperature of the projected liquid aerosol above the evaporation temperature of all liquid solvents in the aerosol.

5. The method of claim 2, wherein the step of exposing includes adjusting the plurality of radiant energy or thermal sources to delineate distinct phase boundaries of the projected aerosol within the deposition chamber.

6. The method of claim 1, wherein the step of projecting includes using a preheated gas or gas mixture to project the liquid aerosol and which determines the controlled gas atmosphere in the deposition chamber.

7. The method of claim 1, wherein the metalorganic precursors consist of carboxylate salts, alkoxides, or metal alkyls, or β-ketonates.

8. The method of claim 1, wherein the surface is heated in the step of heating to a temperature above 250° C. and below any crystallizing nucleation temperature of the amorphous material to be formed.

9. The method of claim 8, wherein the surface is heated to a temperature less than 400° C.

10. The method of claim 9, further comprising removing any residual organic material from the amorphous material by the application of a heat treatment in a controlled gas atmosphere that raises the temperature of the formed amorphous material to ≦450° C.

11. The method of claim 10, wherein the heat treatment is performed with the simultaneous application of ultraviolet light.

12. The method of claim 1, further comprising forming a crystalline material from formed amorphous material with a subsequent heating step.

13. The method of claim 12, wherein the subsequent heating step is a rapid thermal annealing step.

14. The method of claim 12, wherein the formed crystalline material has a grain size less than 100 nm in length.

15. The method of claim 14, further comprising removing the surface upon which the amorphous material was formed.

16. The method of claim 12, wherein the formed crystalline material is semiconductor, metal, super-alloy or ceramic.

17. The method of claim 12, wherein the formed crystalline material is a semiconductor selected from the group consisting of gallium arsenide, cadmium telluride, silicon-germanium, germanium, or copper indium gallium selenide.

18. The method of claim 12, where the liquid metalorganic precursors are mixed at the molecular level, and further wherein the formed crystalline material has a chemical mixture of elements that are uniformly subdivided at the atomic scale.

19. The method of claim 1, wherein the amorphous material is a metal oxide ceramic and the controlled gas atmosphere comprises air, an inert gas mixture containing an oxygen partial pressure, or an inert gas mixture containing chemically oxidizing partial pressures of carbon dioxide and carbon monoxide.

20. The method of claim 1, wherein the amorphous material is a metal alloy, superalloy, a semi-metal or semiconductor and the controlled gas atmosphere comprises an inert gas mixture containing argon, nitrogen or hydrogen, or chemically reducing partial pressures of carbon dioxide and carbon monoxide.

21. The method of claim 1, wherein the formed amorphous material has an elemental composition which varies ≦±1.5 mol % at the atomic scale.

22. The method of claim 1, wherein the formed amorphous material is amorphous silica, indium-tin oxide, gallium arsenide, cadmium telluride, silicon-germanium, germanium or copper indium gallium selenide.

23. The method of claim 1, wherein the liquid metalorganic precursors are mixed at a molecular level, and further wherein the amorphous material has a chemically precise mixture of elements that are uniformly subdivided at an atomic scale.

24. An apparatus for forming an amorphous material comprising:

a deposition chamber;

a spraying device located for projecting a liquid aerosol of metalorganic precursors toward a surface located in the deposition chamber;

a plurality of radiant energy or thermal sources located on a side of the deposition chamber to create a plurality of internal process areas to phase separate and evaporate liquid solvents from aerosolized metalorganic precursors prior to contact with the surface; and a heater adapted to heat the surface to a temperature higher than the decomposition temperature of the metalorganic precursors, wherein the heater is effective to cause decomposition of the metalorganic precursors upon contact with the surface when heated to form the amorphous material.

25. The apparatus of claim 24, wherein the plurality of radiant energy or thermal sources form a thermal gradient to raise the temperature of the metalorganic precursors exposed thereto.

26. The apparatus of claim 25, wherein thermal gradient is adapted to raise the temperature of the projected liquid solution above the evaporation temperature of all liquid solvents in the liquid aerosol.

27. The apparatus of claim 24, further comprising a controlled gas atmosphere in the deposition chamber, wherein the controlled gas atmosphere and the heater are effective to cause decomposition of the metalorganic precursors upon contact with the surface to form the amorphous material.

28. The apparatus of claim 27, wherein the spraying device includes a gas source for use in projecting the liquid aerosol and for thereby providing the controlled gas atmosphere and further comprising a supplemental heater coupled for preheating gasses from the gas source prior to projecting the liquid aerosol.

29. The apparatus of claim 24, further comprising a secondary bake out station that provides a controlled gas atmosphere and is adapted to remove any residual organic matter by heat treating the formed amorphous material at temperatures between 400° C. and 600° C.

30. The apparatus of claim 29, wherein the secondary bake-out station includes an ultraviolet light source used to accelerate the removal of organic material from the formed amorphous matter.

31. The apparatus of claim 24, further comprising an annealing station having a controlled gas environment and a heating mechanism effective to crystallize the formed amorphous material.

32. The apparatus of claim 31, wherein the heating mechanism is a rapid thermal annealing mechanism.

33. The apparatus of claim 32, wherein the rapid thermal annealing mechanism is an atmosphere controlled ionizing plasma.

34. The apparatus of claim 24, further comprising a robotic handling system adapted to transfer formed amorphous material between one or more deposition chambers, one or more secondary bake-out stations, and one or more annealing stations.

35. The apparatus of claim 34, further comprising an overall control system for coordinated operation of the robotic handling system, one or more deposition chambers, one or more secondary bake-out stations, and one or more annealing stations.

36. The apparatus of claim 34, further comprising a device adapted to provide a localized gas environment for shielding the formed amorphous material or reactive elements located on the surface from hazardous atmosphere.

37. A material comprising four or more elements in a crystalline material of macroscopic dimensions and having an elemental composition which varies ≦±1.5 mol % at the atomic scale.

38. The material of claim 37 wherein the elements have a crystalline structure and a uniform grain size less than or equal to 100 nm.

39. The material of claim 37, including copper indium gallium selenide.

* * * * *